United States Patent
Levett et al.

(10) Patent No.: US 7,627,658 B2
(45) Date of Patent: Dec. 1, 2009

(54) PRESENTATION SERVICE WHICH ENABLES CLIENT DEVICE TO RUN A NETWORK BASED APPLICATION

(75) Inventors: David Lawrence Levett, Woking (GB); Robert Ian Mills, Wintney (GB); Yih-Chyun Jin, London (GB)

(73) Assignee: Integra SP Limited, London (GB)

( * ) Notice: Subject to any disclaimer, the term of this patent is extended or adjusted under 35 U.S.C. 154(b) by 1025 days.

(21) Appl. No.: 10/467,883

(22) PCT Filed: Feb. 12, 2002

(86) PCT No.: PCT/GB02/00581

§ 371 (c)(1),
(2), (4) Date: Feb. 17, 2004

(87) PCT Pub. No.: WO02/065278

PCT Pub. Date: Aug. 22, 2002

(65) Prior Publication Data

US 2004/0148375 A1    Jul. 29, 2004

(30) Foreign Application Priority Data

Feb. 12, 2001 (GB) ................................. 0103308.3
May 22, 2001 (GB) ................................. 0112433.8

(51) Int. Cl.
*G06F 15/173* (2006.01)

(52) U.S. Cl. ...................... 709/223; 709/203; 709/219; 709/246; 709/248; 715/736; 715/748

(58) Field of Classification Search ................. 709/203, 709/217, 219, 223, 246, 248, 224; 715/736, 715/748, 749
See application file for complete search history.

(56) References Cited

U.S. PATENT DOCUMENTS

| 6,185,600 | B1 * | 2/2001 | Spence et al. ................ 709/203 |
| 6,253,228 | B1 * | 6/2001 | Ferris et al. ................. 709/203 |
| 6,553,410 | B2 * | 4/2003 | Kikinis ....................... 709/218 |
| 6,914,694 | B1 * | 7/2005 | Ichikawa et al. ........... 358/1.15 |
| 6,976,094 | B1 * | 12/2005 | Dalrymple et al. .......... 709/248 |
| 7,143,103 | B1 * | 11/2006 | Zisman et al. .............. 707/102 |
| 7,293,099 | B1 * | 11/2007 | Kalajan ....................... 709/230 |
| 2002/0111814 | A1 * | 8/2002 | Barnett et al. .................. 705/1 |
| 2002/0167543 | A1 * | 11/2002 | Smith et al. ................. 345/762 |

OTHER PUBLICATIONS

Kukulenz et al., "Navigation-dependent visualization of distributed Internet structures," Information Visualization, IEEE International Conference, 2000.*

* cited by examiner

*Primary Examiner*—Oanh Duong
(74) *Attorney, Agent, or Firm*—Saul Ewing LLP

(57) ABSTRACT

A presentation server which enables a client device to run a network based application by sending structured data from one or more data sources to software on the client device. The presentation server decouples the client device from the data source by (i) insulating the data source from needing to handle directly any display, data storage, data querying or communications functions relating to the client device and (ii) insulating the client device from needing to handle communications functions which are specific to the data source.

54 Claims, 16 Drawing Sheets

The AltioLive Deployment Architecture

Architecture

Overview of the components of the ALC

Initiate Client Communication

User Requests Data

AltioLive Client Configuration

Synchronisation Engine Simple Configuration

Synchronisation Engine Complex Configuration

The AltioLive Deployment Architecture

Architecture

The Synchronization Engine serves the initial data according to the information associated with the View (shown below).

An example Service Function.

This screen view shows the datapool, which is used to get updates of items which the user has placed on their watch list.

A NEW_SALE Service Function.

A NEW_BID Service Function

This element specifies the column of the "Select a product" list, including a GET_APPIMG image server command.

The system architecture of an Altio Live application.

Figure 15

The interaction between the Sync Engine and the Application.

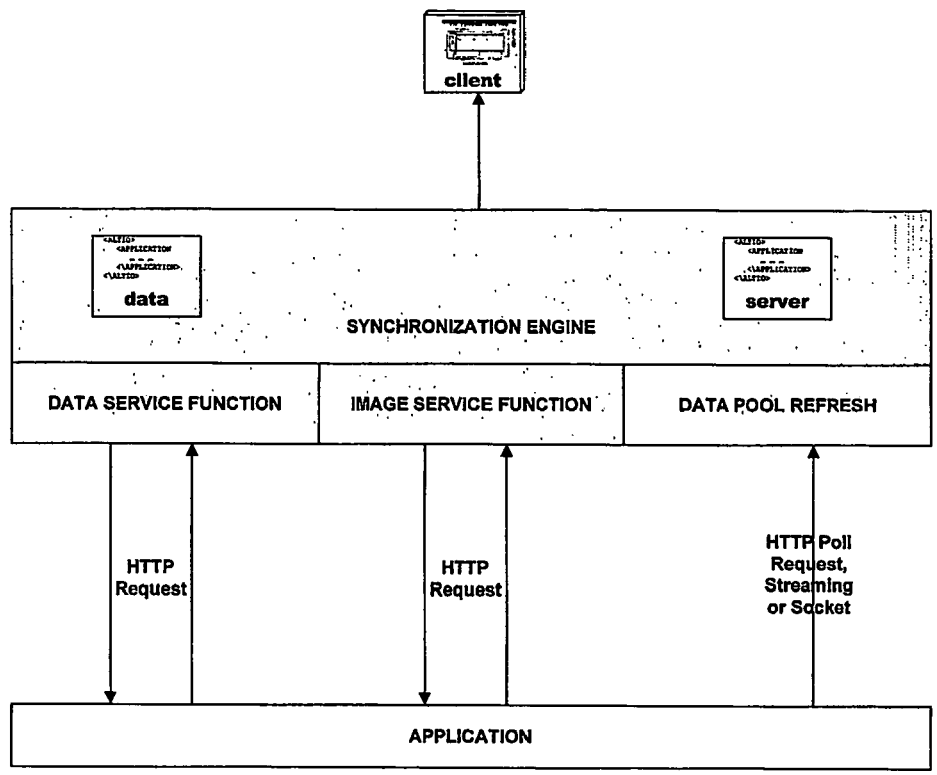

Key:

| Icon | Name | Notes |
|---|---|---|
| | Sync Engine (Sync Engine) | The Altio Live Sync Engine running on an Application Server |
| | Client | The Altio Live Client running within a browser. |
| | Server Configuration | XML definition for the Sync Engine (Datapools, Service Functions, Architecture etc) |
| | Data Configuration | XML definition for the data to be served to the Client. |

When using Altio Live in Dynamic mode it is necessary to change the HTML to reflect the connection to the Sync Engine. Figure 16 shows a typical example of this integration.

The Logon process used by the Altio Demonstration applications.

PRESENTATION SERVICE WHICH ENABLES CLIENT DEVICE TO RUN A NETWORK BASED APPLICATION

CROSS REFERENCE TO RELATED APPLICATIONS

This application claims the priority of PCT Application No. PCT/GB02/00581 filed on Feb. 12, 2002, British Application GB 0103308.3 filed on Feb. 12, 2001 and British Application GB 0112433.8 filed on May 22, 2001, the contents of all three of which are hereby incorporated by reference.

BACKGROUND TO THE INVENTION

1. Field of the Invention

This invention relates to a presentation server which enables a client device to run a network based application client software enabling a client to run a network based application. It finds particular utility in enterprise computing. A 'presentation server' is generally any kind of server that determines how data will be displayed on a client device.

2. Description of the Prior Art

Enterprise computing was originally conducted through large mainframe computers. These mainframes gave the end-user very limited application functionality, displaying only text messages and requiring keyboard strokes for every command (for example, there was no mouse and none of the richness of today's desktop applications like drag and drop, graphing, sorting or personalized settings). Deployment costs were also very high due to the cost of hardware and the lack of skilled computer operators.

The evolution to client/server-based computing provided much richer functionality. The graphical user interface (GUI) provided end-users a much simpler, more efficient method to interact with applications, but systems still proved expensive and difficult to maintain. In theory, applications would be deployed on the server centrally and distributed via the network to each of the clients. But business users had different needs of functionality and therefore required different applications with unique configurations. Not only did some information have to be personalized, but information also had to be retained on the desktop. This meant it was not possible to "write once and deploy many". The result was that the end-user got the desired rich functionality, but much of the code for the business logic for the applications was located on individual clients. IT Departments' budgets ballooned due to high support costs and slow implementation times. Rolling out new applications—or even minor updates—required a unique installation for every PC that required access.

The advent of the Internet was supposed to change all this. The Internet provided an infrastructure that lent itself to the notion of zero-cost deployment with the promise of "write once, run anywhere". Such a model would significantly decrease the cost of deploying enterprise systems. With the Internet, back-end servers would run the application centrally, and all that users required to access the application was a browser. There would be no code specific to the application running on the user's client. The potential this promised to large companies was unprecedented.

Despite the enormous potential, the initial technology (HTML) used for building and deploying the front-end of these new Internet applications was never intended for anything more than displaying simple text. As companies tried to deploy sophisticated business systems over the Internet, they soon realized that much of the desired functionality they wanted was not feasible. HTML based Web Applications did not have true interactivity or access to data in real-time. Business users needed to interact with and manipulate the data, but mostly what they saw was static page views. Certain solutions were designed to provide a more interactive user interface. However, they still used variations of HTML, resulting in passive documents with numerous limitations.

Specifically, from a technical perspective these limitations resulted in:

Lack of functionality: No matter how sophisticated the back-end business logic, end-users lost the functionality they had come to expect from their familiar client/server-based system. Large online systems that were deployed severely lacked the rich functionality that companies demanded in their offline systems. While lots of money was spent on building these systems, to date they have dearly not replaced client/server systems. In fact, very few even augment the existing offline systems, and in retrospect proved to be very expensive IT exercises which fell short of their original promise. There have been early attempts at providing a richer user interface and a more robust connection between the back-end servers and the client by using JavaScript, DHTML, and various plug-ins. However, these solutions present expensive development cycles and ongoing maintenance, while introducing new security issues (see below), and applications that still fall short of the desired functionality.

Load on back-end Servers: The HTML-based Web represents a very inefficient use of computing resources. Publishing HTML's required page by page structure means that as more people log on to a system, requests to the database and the application server put a strain on these servers. Companies needing to scale operations can buy more servers with more CPUs to handle the high load, but each additional processor not only costs a lot, but may also affect the license cost of all the various software packages running on the server.

Security Concerns: Companies are concerned that data pushed beyond corporate firewalls onto the Internet is open to unauthorized, third-party scrutiny. Additionally, there is concern that plug-ins downloaded from various Internet applications may contain viruses. Most software companies license their software on a per-CPU basis. As companies add more CPUs to their servers or add entirely new servers, the licensing fee for each piece of software increases by a multiple of how many new processors are added.

Cannot Easily Prototype New Features: Given the complexity of developing user interfaces that provide adequate functionality and the effort required to integrate such solutions to the back-end, companies typically do not prototype and roll out new features incrementally. Very often, further development of these systems is an extensive project, which introduces the uncertainty of never being fully deployed and used. Because of the effort required for each release, many companies shy away entirely from going forward on certain projects as opposed to rapidly developing incremental pieces to see what parts work.

From a business manager's perspective, these limitations meant:

Inadequate Systems for Doing Business: Client/server-based systems were expensive, difficult to build and deploy and not accessible outside of the enterprise. However, they do provide the functionality needed to actually do business, whether for trading financial instruments, managing resources and accounts through ERP systems or selling and maintaining client relationships through SFA and CRM tools. A fraction of these capabilities are available over the Internet in certain systems, but are far from giving the functionality people require to be effective.

Slow Performance: Sites using HTML force users to click and wait for a response while the back-end system processes the information and pushes a new page to the users. This can take a few seconds at best, or tens of seconds, even minutes, at worst. Users of these systems simply abandon activities when they take too long or when connections entirely fail.

Expensive Development: Building and deploying enterprise-level systems over the Internet with sophisticated functionality requires a lot of custom coding with long and expensive development cycles. Most of this work cannot be leveraged for other systems and is a large, one-off expense that companies must absorb.

Expensive Maintenance: Complex Web systems contain thousands of lines of code on both the back-end (business logic) and the front-end (delivers the interface). The connection between the front-end and backend also contains thousands of lines of custom code which needs to be debugged and maintained. All changes to the code require programmers to manually write new code and test the functionality through staging before going to a live production site.

Expensive Bandwidth: In today's online systems, information is presented to users through entire Web pages, which are pushed out to users over the network. As information changes or transactions are completed, users can request new pages or submit pages back to the system. However, every time pages are sent across the network, companies pay for the bandwidth used. As online systems add users and these users start to do more activities online, they consume more and more bandwidth, and as a result costs increase quickly.

Mobile Access: As the reach of the Internet extends beyond the PC, enabling mobile access (i.e. PDAs, Cellular Phones) to business applications is becoming a standard business requirement. Current solutions for wireless delivery require separate application re-writes (and expertise) for each device supported.

Hiring and Retraining expensive IT Staff: Integration of Web systems with existing offline systems and the maintenance of more sophisticated user interfaces for the Web using JavaScript and HTML typically requires armies of programmers, burdening the budget of every department, and many times putting the overall company's viability in jeopardy.

As a result of these challenges experienced to date, companies still have limited confidence in deploying their systems through the Web. Re-creating the same feature-rich interfaces that existed on client/server-based desktop applications has proven futile for companies attempting to move their systems to the Internet Replicating the performance of desktop applications as well as standardizing the collaboration and interaction between disparate Web applications has been even more complex, expensive, and mostly elusive. The massive trade-off in end-user productivity, combined with security, scalability and performance concerns, has resulted in enterprises running client/server systems in parallel with Web-enabled systems, further deepening the cost of IT, and still not realizing most of the benefits the Internet promised.

Hence, even though millions of people are now using the Internet to look at documents from anywhere in the world, true interactivity to manipulate data is missing, and the evolution of the Web into a mainstream business and trading environment simply has not happened.

SUMMARY OF THE PRESENT INVENTION

In a first aspect of the invention, there is a presentation server which enables a client device to run a network based application by sending structured data from one or more data sources to software on the client device, wherein the presentation server decouples the client device from the data source by (i) insulating the data source from needing to handle directly any display, data storage, data querying or communications functions relating to the client device and (ii) insulating the client device from needing to handle communications functions which are specific to the data source.

Because the present invention relates principally to a client server architecture, it may be helpful to describe the entire client/server architecture at this point so that the presentation server ('Presentation Server') can be seen in context. This client server architecture envisages a new approach which is neither entirely thick client, nor entirely client-server, nor entirely fully distributed, but blends aspects of each. (The Presentation Server could in principle also be implemented in a peer to peer architecture, or in an entirely closed device, but the client server architecture is currently seen as the most commercially significant).

The Presentation Server receives structured data (or supersets of it) over a network from an originating data source, which may be a web server, a back end application, a messages queue or a web service (or multiple sources of these types) able to generate structured data, such as XML or SQL format data directly (or indirectly through a generator). It then intelligently passes that data onto client devices which require it. The client in one implementation is a unique three layer client, in which the three layers are:

(a) a communications layer to send and receive messages over the network;

(b) a database layer to store, and allow querying of, the structured data;

(c) a rendering layer which generates, from the structured data in the database layer, data for a user interface;

such that the client software is self-contained to provide all of the communications, data storage and rendering resources needed to run the network based application on the client device.

The Presentation Server subsequently keeps the database layer in the '3 Layer System' automatically updated (or 'synchronised') with the originating data source. The Presentation Server insulates the originating source from needing to know which clients need to be updated, what updates they need, how to communicate with clients, and the user interface at the clients. This overhead is instead handled by the Presentation Server; this approach allows a networked application developer to concentrate on application business logic development, rather than the front-end display/communications and synchronisation elements that traditionally take over 50% of developers' time. Strictly separating the data source from the client device allows the business logic of an application to be fully independent of the presentation logic on the client device, such that the data source need not even know of the existence of a client device even though it may be a necessary part of the network application. Similarly, it allows the presentation logic of a client device to be fully independent of the business logic on the data source, even to the extent that the client device need not even know of the existence of a data source even though it may be a necessary part of the network application.

By pre-fabricating these complex functions and capabilities into a generic Presentation Server, networked application developers can produce finished applications far more quickly than previously. Scaling to large numbers of clients (10000s) is also possible, even for legacy back end systems which are limited to serving 10 or fewer clients. This is because the back end system needs to supply information just once to the Presentation Server, the Presentation Server itself is fully scalable (e.g. multiple CPUs; multiple CPUs on multiple machines etc.) to serve the required numbers of client devices.

Communication between the Presentation Server and the data source can be carried out locally or over a network and interaction can occur:

- via services provided by the data source (e.g. HTTP & CGI; SOAP);
- via message queues to which the data source publishes and the Presentation Server subscribes;
- via message queues to which the Presentation Server publishes and the data source subscribes;
- via direct calls to the data source's application programmable interface (API) where the underlying system provides the low-level protocol (e.g. Remote procedure calls; CORBA);
- via direct calls to one or more databases on the data source;
- in a loosely coupled way (e.g. via e-mail or ftp file transfer).

The Presentation Server can be thought of as allowing the data source to configure or handle indirectly any display, data storage, data querying or communications functions relating to the client device by forwarding communications from the data source to client software on the client device. The data source only indirectly configures the client device because it is the Presentation Server which:

- manages updates of the structured data held on the client device by regularly polling the data source for changes;
- directly manages distribution of streaming data to multiple client devices, where the data source needs only to provide a single stream to a Presentation Server which in turn broadcasts the information in a scalable fashion to multiple (potentially more than tens of thousands) of client devices that may in turn be connected to the Presentation Server at different performance rates over the network;
- handles communications functions specific to different client devices by having a generic communications capability (data receipt/acknowledgement/response) enabling it to communicate with multiple client browsers, multiple client device types and across multiple bearers; or
- handles communications functions specific to different client devices by having a generic display capability by being able to download to the database layer one or more of the following, each configured appropriately for a destination display, device type and bearer: such as panels, windows, controls, data binding to the controls and event models.

Additionally, the Presentation Server can insulate the client device from:

- needing to directly handle communications functions which are specific to the data source, by translating messages from the client device to a form suitable for the data source;
- needing to directly interpret raw data provided by the data source, by translating messages from the data source to a form suitable for the client device;
- needing to directly manage updates of the structured data held on the client device, by receiving a single data update from the data source and being solely responsible for identifying all client devices that need that data update, and sending the appropriate updating data to all of the client devices that need it;
- needing to know the quantity or configuration of multiple data sources to which the Presentation Server is connected, by aggregating data from multiple data sources into a single data stream for each client device.

Further key features of implementations of the Presentation Server are defined in the claims. Implementations of the invention include a Presentation Server which:

- maintains a data stream per client device in which the data is pushed over a persistent connection to the client device over the network as soon as it is available;
- maintains a data stream per client device in which the data is sent to the client device over the network in response to regular or ad-hoc polling requests from the client device;
- compresses the data received from the data source prior to sending the information to the client device;
- encrypts the data received from the data source prior to sending the information to the client device, thus insulating the data source from the enhanced security needed to allow a remote client device to run the network application over a public or insecure network;
- decrypts the data received from the client device prior to sending the information to the data source, thus insulating the data source from the enhanced security needed to allow a remote client device to run the network application over a public or insecure network;
- can process a request by the client device for an update to a data source and return an indication of whether the update was successful as indicated by a response from the data source; if the update fails, the data source may optionally provide further information about the reasons for the failure in a way that can be displayed or interpreted by the client device (e.g. in an equity trading application, the data source might indicate that the quantity of a stock to be purchased exceeds some limit imposed by business rules and can notify the Presentation Server of the problem who in turn can forward the information to the client device);
- can process a request by the client device for an update to a data source and return an indication of whether the update was successful even if the data source does not directly respond with a success or failure indication (e.g. where no response for a period implies a failure to update the data source); it may be configured to automatically generate responses to the client device on behalf of the data source;
- can process a request by the client device for a single transaction update to multiple data sources and return an indication of whether the update was successful;
- can process a request by the client device for a single transaction update to multiple data sources in such a way that all data source updates are only confirmed once each data source has preliminarily indicated that the update would succeed;
- provides that failure of any one of the transaction updates causes all the transaction updates to be cancelled and a failure response to be returned to the client device that requested the transaction;

provides that a preliminary validation of all transactions causes all transactions to be confirmed and returns a success indication to the client device that requested the transaction;

returns the message that results in the user interface at the client device being updated at the same time as it issues a message that results in the user interface of different client devices being updated in the same manner;

can update marginal portions of the database layer in a client device by sending, instead of an entire structured data tree hierarchy, a key which identifies the part of the structured data tree which has changed;

can update a database layer by altering, in real time, configuration data held in the database layer which defines how the structured data can be interacted with from within the user interface;

can prioritise updates to a client device that is returning on-line after an absence;

can update the database layer by re-initialising all of the structured data on a client device that is returning on-line after an absence by applying rules to determine if re-initialisation is appropriate;

stores updated structured data in a transaction log record from which a client can pull updates;

stores updated data in a transaction log record and pushes updates as appropriate to the client device;

is able to send updating data to different client devices at different times or frequencies;

can be configured to skip unnecessary intermediate updates to streaming data for devices whose connection or client device is too inefficient to receive and process every update (e.g. an equity quote application might update 10 times a second, but a certain device might not accept more than an update every 5 seconds. In this case, the Presentation Server would effectively send only every $50^{th}$ update to that client device, whilst it might simultaneously send all 50 updates to another more efficient client device);

can maintain a statefull connection with the client device, e.g. by routing a unique, incrementing number to the client device, which the Presentation Server logs in relation to all data updates, so that when the client device returns on-line from an absence, the client device sends the latest number it received back to the Presentation Server so that the Presentation Server can determine what updates the client device did not receive and therefore need to be sent;

is sent by the client device any parameters that need to be persistent and stores these parameters or routes them to storage for later retrieval;

provides scalability in the number of client devices a network based application can communicate with by being itself scalable with:
  (a) multiple CPUs on a machine;
  (b) multiple CPUs on multiple machines in a parallel or in a parent/child arrangement;
and manages the message flows from each CPU to the applicable client devices;

provides fault tolerance by being itself scalable with:
  (a) multiple CPUs on a machine;
  (b) multiple CPUs on multiple machines in a parallel or in a parent/child arrangement, providing a mechanism to automatically compensate for failures of instances on one or more CPUs by reconfiguring the network configuration at run-time and optionally re-establishing connectivity for each orphaned client device to an alternate Presentation Server;

can form part of a network of several geographically separated Presentation Servers, some or all of which operate as edge servers;

can form part of a network of several geographically separated machines organised into a topology which is appropriate to the physical arrangement of sites in a business running the network based application;

can combine structured data from several different server based applications for a given client device;

can determine automatically and in real time, when a client device requests several images, whether it should reduce bandwidth consumption by placing all of the images into a single, composite image file, each image sharing data which is not image specific;

modifies the data it sends to a client in dependence on information sent to it from the client which relates to the display limitations of the client device.

uses a session object associated with an applet to determine the specific display parameters and structured data to be served to the client device.

Other aspects of the invention include:

A web application which, when invoked or run, causes a Presentation Server as defined above to be run;

A hardware server which hosts a Presentation Server as defined above.

BRIEF DESCRIPTION OF THE DRAWINGS

The present invention will be described with reference to the accompanying drawings, in which:

FIG. 15 is a schematic of the interaction between the Synchronization Engine and the Application with emphasis on three main areas; the Data Service Function, Image Service Functions and Datapools;

DETAILED DESCRIPTION OF THE PREFERRED IMPLEMENTATION

Figure 1:
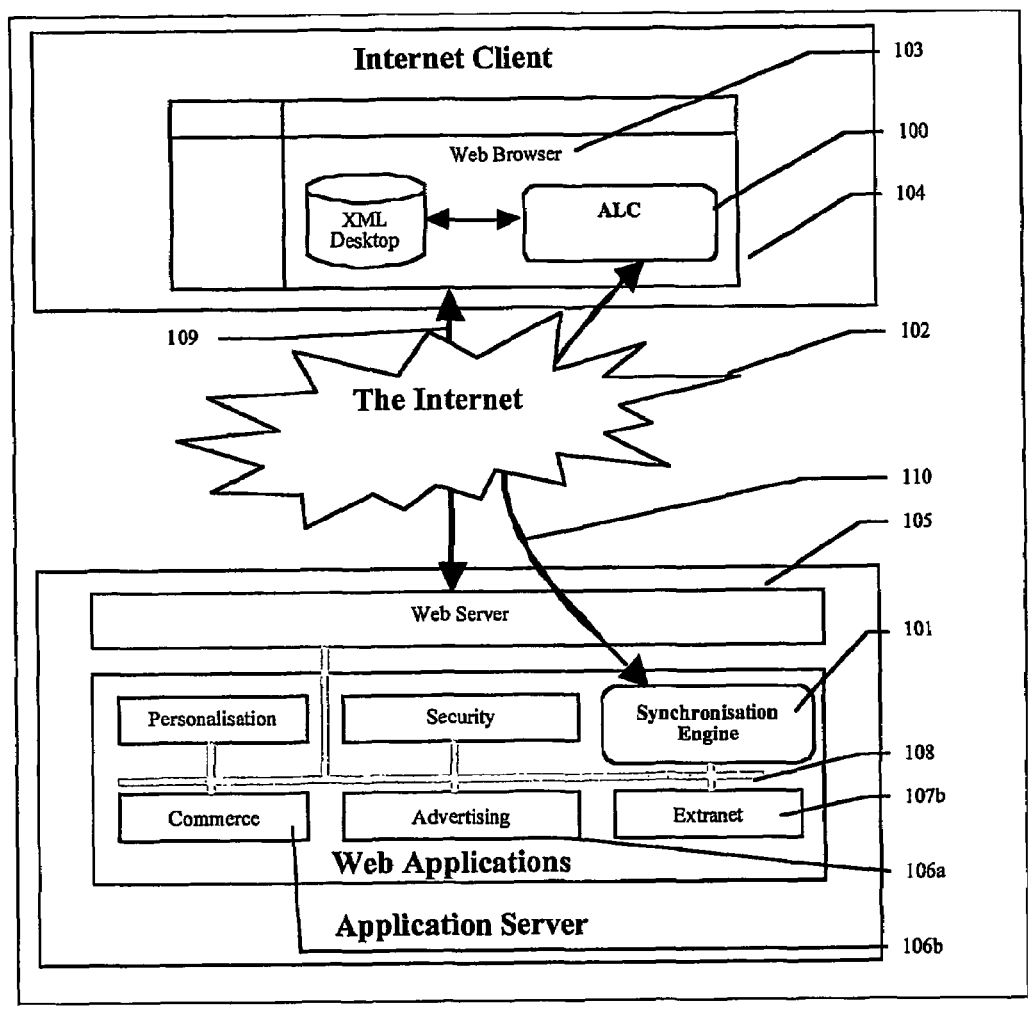
FIG. 1 is a schematic of the main components of the AltioLive Client (ALC)

The invention will be described with reference to an implementation called AltioLive, from Altio Inc. of Boston, Mass., USA. This Detailed Description is organized as follows:
A. AltioLive—a Brief Overview of the Overall Architecture
B. AltioLive Client—Overview
C. AltioLive Presentation Server—Overview
D. AltioLive Client—Details
E. AltioLive Synchronisation Engine (SE)—Details
F. Deploying AltioLive
G. Security Aspects of AltioLive
H. AltioLive—Benefits of using AltioLive
I. Glossary
Appendix I "Getting Started with AltioLive" from Altio Inc.; Chapter 3 titled 'The AltioLive Presentation Server'
Appendix II "Integrating AltioLive" from Altio Limited; Volume 4 Chapters 1-5 of the AltioLive User Documentation.

A. ALTIOLIVE

A Brief Overview of the Overall Architecture

AltioLive solves the technical challenges of streamlining development, deployment and maintenance of real-time interactive Internet/web applications. Updates to data items are received 'live' at a client device and can be transmitted concurrently and automatically to client devices to avoid users requesting updates and then having to wait for server responses. Access to the application through alternate devices (e.g. wireless access) presents the user with their data automatically rendered for display and navigation on the device, whether it is a cell phone or a Personal Digital Assistant (PDA). For certain PDAs, AltioLive can be implemented directly (e.g. IPAQ). For cell phones, Web TV and lightweight PDAs, the application is provided via HTML or WML pages generated by a renderer engine in the Presentation Server. Thick client functionality is not provided on these devices.

Applications developed with AltioLive provide users the ability to move between windows inside the browser, scroll or sort through lists, resize columns and see details on selected items (including charts and graphs). The windows can be minimized, maximized, moved around and resized, just like in a standard desktop application. Customizable toolbar buttons allow the user to pop-up additional windows to view further details such as lists, forms or graphs. Data entry is provided through the typical controls such as text boxes, checkbox, drop-down lists etc. with additional complex controls such as graphs, tree-views, date and color pickers.

Since developing applications with AltioLive requires virtually no coding, development and ongoing maintenance efforts are reduced up to 75% while bandwidth and server-side processing decrease by a similar order of magnitude.

In AltioLive, an Altio Presentation Server ('APS') deploys and intelligently manages real-time, interactive Internet or Web applications by serving appropriate XML data to client devices. The functions of the APS are (a) to receive and store XML data from the source of that data (e.g. web server, web service provider etc.); (b) to supply to each client device an appropriately configured 3 Layer System—in this instance a generic applet (as described above)—this generic applet handles client device display and communications functions; (c) configuration, initial data and supporting files images and 'skins') and (d) to provide XML formatted data updates to the client in real-time and (e) to process client device requests to process updates and/or provide further information.

The APS therefore assumes responsibility for properly configuring the generic applet so that the database layer (an XML database layer in the case of AltioLive) on the client displays the correct data for a particular user, in the correct format and with window controls appropriate to that user, and in an optimal manner for the display capabilities of different client devices. It also assumes responsibility for all communications functions to/from the client device by appropriately configuring the generic applet, which it sends to the client device. The communications functions enable data to be exchanged with any device type and OS (e.g. PC, Apple™, Unix™, Symbian™, Palm™ etc) and over any bearer/protocol.

The updating function ensures that all client devices are up to date or synchronized. In AltioLive, this function is achieved using one or more clustered 'Synchronization Engines' (SE). A SE is a server-side software application, which runs on the Altio Presentation Server, and coordinates and controls the interaction between multiple clients, Web applications and server data sources over multiple communication protocol types, while still being configurable via industry standard XML. The SE allows for enterprise scale real-time data updates without the need for a client to use a browser 'refresh' button; live data synchronization across multiple users is possible. Static applications can therefore be transformed into dynamic ones and these applications can be extended to multiple devices in different formats, all from a centrally managed location.

In AltioLive, the generic applet is called the AltioLive Client; this applet enables live data to be displayed in fully interactive windows inside a user's browser. Upon a request to the web server or other ultimate data source, by the client device, the AltioLive Client is deployed to the user's machine from the SE as a small Java applet. The applet is generic and self-contained—i.e. no additional code is needed to make it suitable for a specific purpose. Instead, it interprets the configuration file sent from the SE to implement different views and behaviours so that it works for a specific web application/client device/bearer combination.

B. ALTIOLIVE CLIENT

Overview

The AltioLive client has three layers:

(a) a generic communications functions layer (establishing and maintaining connections; re-connecting; updating etc.);

(b) a generic rendering/graphics layer (generates appropriate screen responses to mouse drags and actions etc.) and (c) a database layer (stores applet configuration parameters and UI parameters like windows, window controls, data binding to these controls and event models; stores also the web application related data (a super-set of what is displayed at any time)).

All three layers are necessary parts of the 3 Layer System, and each plays an important role in delivering the desired functionality/behavior.

B.1. The Communications Layer

The communications layer provides a means to robustly send and receive messages between the network based application running on the client, and the necessary supporting Presentation Server.

Key Features:
- Establish connection with Presentation Server to obtain interface configuration information (in a current implementation this is delivered as XML)
- Establish occasional on-demand connection with the Presentation Server to obtain ad-hoc information as needed by the network based application (e.g. a response to a search query)
- Establish occasional on-demand connection with the Presentation Server to deliver new and/or updated network based application data to the Presentation Server (e.g. when a user submits a form), and await a response on success/failure
- Establish regular polling connections to receive network based application data to be presented in the interface
- Establish and maintain a persistent connection to a Presentation Server if required for low-latency receipt of streaming data
- Establish occasional connections with the Presentation Server to ensure server is alive (functioning) if needed when no streaming data has been received for a significant period.
- Interface to the Database Layer to deliver new and updated information from the Presentation Server
- Interface with Database Layer to receive messages to be sent to the Presentation Server (e.g. when the network based application data is changed)

B.2 The Database Layer

The Database Layer provides a means to hold and query network based application data and user interface configuration data as well as an interface to the Communications Layer and the Rendering Layer.

Key Features:
- In the generic case it receives digital information from the communications layer and efficiently store it for later access on demand
- Receive structured data from the Communications Layer that may later be queried using a query language to combine and/or extract specific subsets of data on demand
- The structured data may be XML; XML querying approaches can be used to combine and/or extract data subsets
- The Database Layer can provide temporary caching of network based application data on behalf of the rendering layer, in order to reduce and/or minimize the need for the 3 Layer System to communicate with the server in the course or running the network based application.
- The Database Layer supports dynamic additions, modifications and deletions to the information it holds, triggered either by the Communications Layer or the Rendering Layer.
- The Database Layer responds on demand to requests for information from the Rendering Layer.
- The Database Layer may in response to a request from the Rendering Layer, issue a request in turn to the Communications Layer to retrieve further information from the Presentation Server (e.g. when the Rendering Layer has asked for data not yet present in the Database Layer)
- The Database Layer may have a means to manage its size and may choose to expire and/or archive old or infrequently accessed information
- The Database Layer works in conjunction with the Rendering Layer to automatically trigger changes to the user interface to reflect the current state of the data in the Database Layer

B.3 The Rendering Layer

The Rendering Layer provides a means to (a) combine information describing an interface for a network based application with information to be rendered within that interface and (b) dynamically construct and manage the display of the application interface on the host client platform (e.g. a web browser or handheld device).

- The Rendering Layer generates a user interface that reflects the state of the information in the Database Layer
- Subject to the capabilities of the client device, the Rendering Layer can generate a dynamically updated user interface that continually reflects the latest state of the information in the Database Layer
- The Rendering Layer may support interaction with an end user through inputs from an external input device (e.g. a keyboard, button panel or mouse)
- The Rendering Layer may generate a network based application interface at the pixel level
- The Rendering Layer is responsible for generating and managing user interface controls (e.g. text entry boxes, charts, scroll-bars)
- The Rendering Layer may display information in a traditional desktop format using multiple overlapping views.
- The Rendering Layer may support user interaction with the user interface such as drag & drop of information between views, entering data into a text box, pressing a button.
- The Rendering Layer may support rendering of network based applications on devices and/or in a form other than pixels on a screen. (e.g. lines of text on a cell phone or LEDs on a domestic appliance)
- The Rendering Layer may support interfaces to alternative rendering mechanisms independently of its own drawing capabilities (e.g. Javascript calls and triggers to and from the Rendering Layer)

Other key features of the AltioLive Client are:
- The generic applet provides a generic display capability by being able to download from the remote Presentation Server one or more of the following, each configured appropriately for the destination browser, device type and bearer: windows, controls on the windows, data binding to the controls and event models. The XML data is bound to the controls and event models, so that a web application developer need only define what data is to be associated with each window control; the applet then handles how data should be displayed when different events occur (e.g. if the data is a list of names, the applet handles how the name list is displayed if a 'sort by alphabetical order' control is selected). This 'View' definition can be made specific to each user—allowing different users to be able to see or manipulate different data sub-sets and hence providing an access control mechanism.
- The applet provides a zero-client footprint in that it is (a) installed on a client device only in response to the client device initiating or requesting a web application or web service and therefore does not need to be pre-loaded or installed and, (b) after the client device has ceased using the web application or web service, it may be removed entirely from the client device.

The small size of the applet allows it to be rapidly downloaded. Once the Java applet is running on the user's machine, it maintains a persistent connection with the Presentation Server. The Presentation Server will then 'push' or propagate new data to all parties that require it Only data, which has actually changed, is pushed across the network, reducing the bandwidth used, unlike HTML systems that send an entire page when only a single data point in the page alters. Another alternative to the persistent streamed connection is a polling connection, which makes regular requests for data changes. This uses a timestamp mechanism to ensure that only new updates for the individual client making the request are returned.

The XML database provided by the applet enables XML data from two or more different web applications, web services or data sources to be combined or manipulated in one or more windows running in a browser on the client device as though from a single source.

The generic applet can generate multiple windows in a browser window of the client device, with a user able to sort data, edit data, or scroll through data in each of the windows, without the need for there to be any client side software development The generic applet allows XML to be cut and pasted into a clipboard or other form of temporary memory. Hence, a user can drag data (e.g. numerics, text or images) from one window generated by the XML database and drop it into another window—the appropriate changes (including computations) resulting from pasting in the new data into the applicable field of the new window are generated and displayed.

The generic applet can generate multiple windows in a browser window of the client device, with each user able to define a personalised arrangement of windows and data to be displayed in each window, with the data to be displayed in each window capable of being obtained from several different web applications or web services.

XML data is associated with pre-defined controls by a developer and then at run time the generic applet automatically displays the data in conjunction with some or all of those controls.

The XML database can be accessed using XPath queries, in which standard XPath queries are enhanced with the following features: indexed retrieval; direct reference to elements and attributes identified by controls.

Session objects can allow the remote Presentation Server to provide to the XML database the applicable data and configuration parameters appropriate to the client device and the last state of the client device known to the remote Presentation Server. This prevents unauthorised access without a session object. Session objects are user specific, so that users can access a web application irrespective of client device being used. The PS also maintains the notion of a Connection, allowing a single session to support multiple connections (two browser windows for example) each running a different view/configuration.

C. ALTIOLIVE PRESENTATION SERVER (APS)

Overview

The AltioLive Presentation Server (APS) integrates with Web Applications to efficiently and securely distribute live XML data to users across the Internet through the range of Altio Clients. The APS has the following three functional aspects:

Display—The APS provides a trusted architecture for the presentation of real-time interactive applications. Through a tiny, browser-based applet and XML configuration, Internet applications deliver a completely customisable, dynamic interface with desktop-style functionality (e.g. drag and drop, resizable windows, customisable screen colours, customisable fonts, full UI configurability according to user's role and preferences).

Communications—The connection between the application (on the server) and the end-user (on the client) governing the form and method of communication between the application (on the server) and display to the user (on the client). The APS provides a persistent, secure connection between the application and clients, transmitting data via configurable HTTP/HTTPS polling or streaming access mechanisms.

Data Synchronization—Managing data distribution across the user-base, providing all users with the latest data, in real time—from any device.

The live data is displayed in interactive windows inside the users' browsers through the appropriate client:

AltioLive Client (ALC)—delivers a live, interactive, thick-client style user interface within the user's browser.

Pervasive Client (APC)—delivers a page-oriented user-interface rendered for user access through simple devices such as PDAs and mobiles.

Data Client (ADC)—delivers live, interactive data for presentation through a DHTML interface.

Synchronization Engine (SE)

The APS is implemented as one or more clustered Synchronization Engines (SE)s that are monitored and managed through the SE Admin Tool.

D. ALTIOLIVE CLIENT (ALC)

Details

The AltioLive Client is a computer user interface that radically enhances how information can be displayed and updated over Internet technology.

An ALC is composed of a number of components:

An internet client machine;

A web browser supporting a Java virtual machine;

A Java applet,

An XML Desktop Database.

These components are further described below and are shown in FIG. 1.

The ALC 100 typically fits into a configuration that consists of a Web browser 103 in which the ALC runs as a small machine independent client applet. The web browser would be running on an Internet Client 104 that would be connected to a web server 105 via the Internet 102. The web server would be the gateway to the Internet for a number of server based web applications 106a and 106b etc. The Internet Client could be a personal computer running browser software, a Wireless Application Protocol (WAP) mobile phone, a Personal Information Manager (PIM), or other information-viewing device. For live connectivity these devices must support some form of network connection (e.g. by using the Java 1.1 Virtual Machine). The personal computer would typically be a workstation (e.g. PC compatible machine running a Windows™ operating system, Macintosh™ or Unix™ workstation); the browser software could for instance be Microsoft Internet Explorer™ version 5 (See www.Microsoft.com) or Netscape Navigator™ version 4 (See www.netscape.com).

In general the web server 105 would control the communication with the client using standard HTTP 109. Typically the ALC would use HTTP for the initial communication but could then switch to using alternative communication protocols, such as TCP/IP or UDP, which better suit the application. In this way the ALC and the SE set up their own communication link 110.

One of the unique features of the ALC is that the Java Applet is small enough to be downloaded and configured on the browser each time the user starts a session with the application. This then gives rich client functionality without the need for add-ins and complex installation procedures.

Once the ALC is running on the client it creates an XML Database (inside the ALC space) on the desktop which not only stores all the data immediately required by the client but also has all the configuration information on how the interface should look and what the user preferences are.

ALC—SE Interaction

The key to the uniqueness of the ALC is how it interacts with the SE. The SE is a server-side layer that serves the ALC with the configuration, data and updates.

Figure 2:
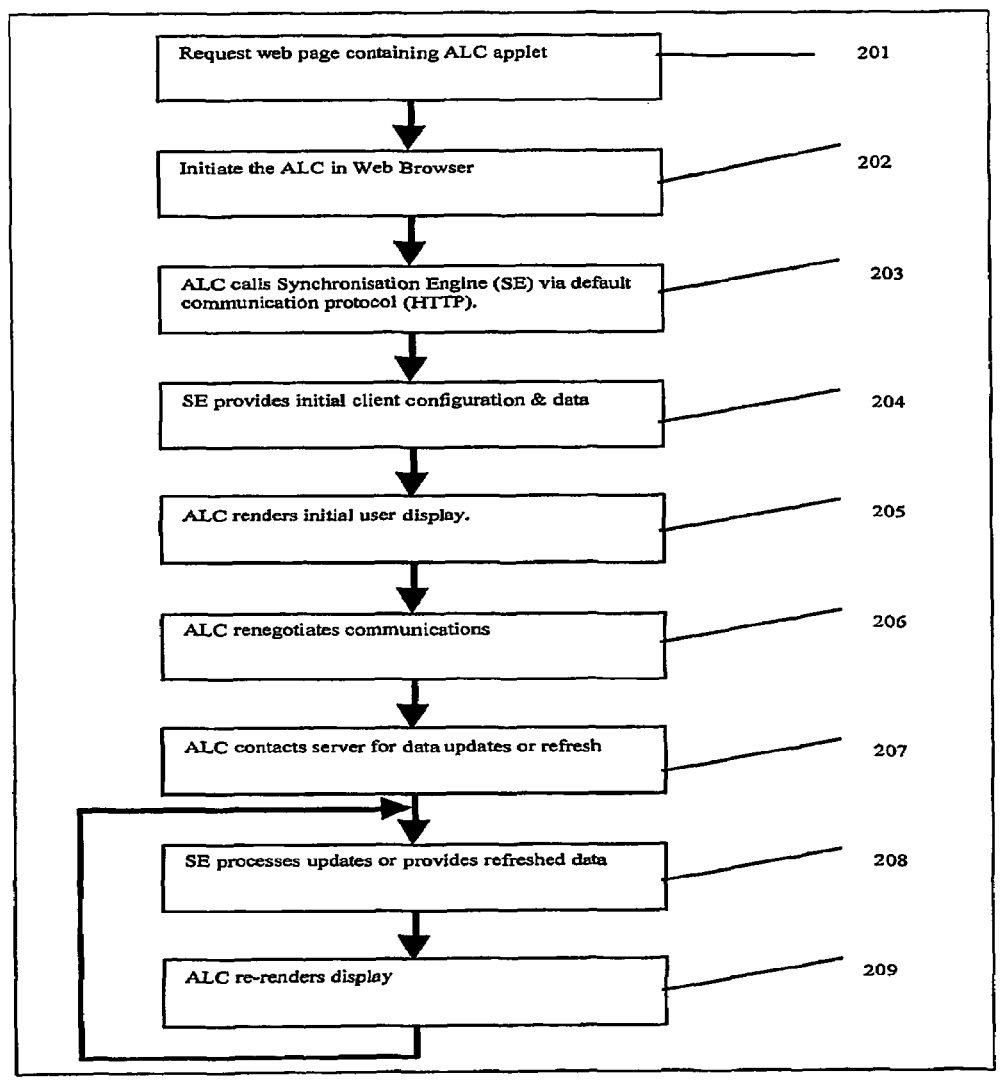
FIG. 2 is a schematic showing the order of events, which occur when a client communication is initiated.

As can be seen in FIG. 2, it is always the ALC that initiates the communication by requesting a page from the web server that contains the ALC applet 201.

The web server will pass the request on to the SE, which will return a page to the client containing the ALC applet. The ALC is then initiated in the client browser and from then on establishes and maintains communications with the SE. To allow the user interface to be personalised, the user must make themselves known to the system and will therefore be allocated a unique key that can be used to reference personal preferences. Upon request from the ALC the SE amalgamates XML from a number of sources to send back to the ALC 204. Typically the SE could get information from the following:

General ALC configuration XML;
User specific interface preferences;
Web Application data, from potentially many applications.

The SE can be configured to retrieve this information in a number of different ways, including standard HTTP calls, SOAP, JDBC, Socket, or JMS. The ALC will use this data to render a display to the user 205. The user can then interact with the data in a familiar desktop environment. As the user interacts with the application the ALC may contact the SE for additional data or it may initiate an update of the data.

Figure 3:
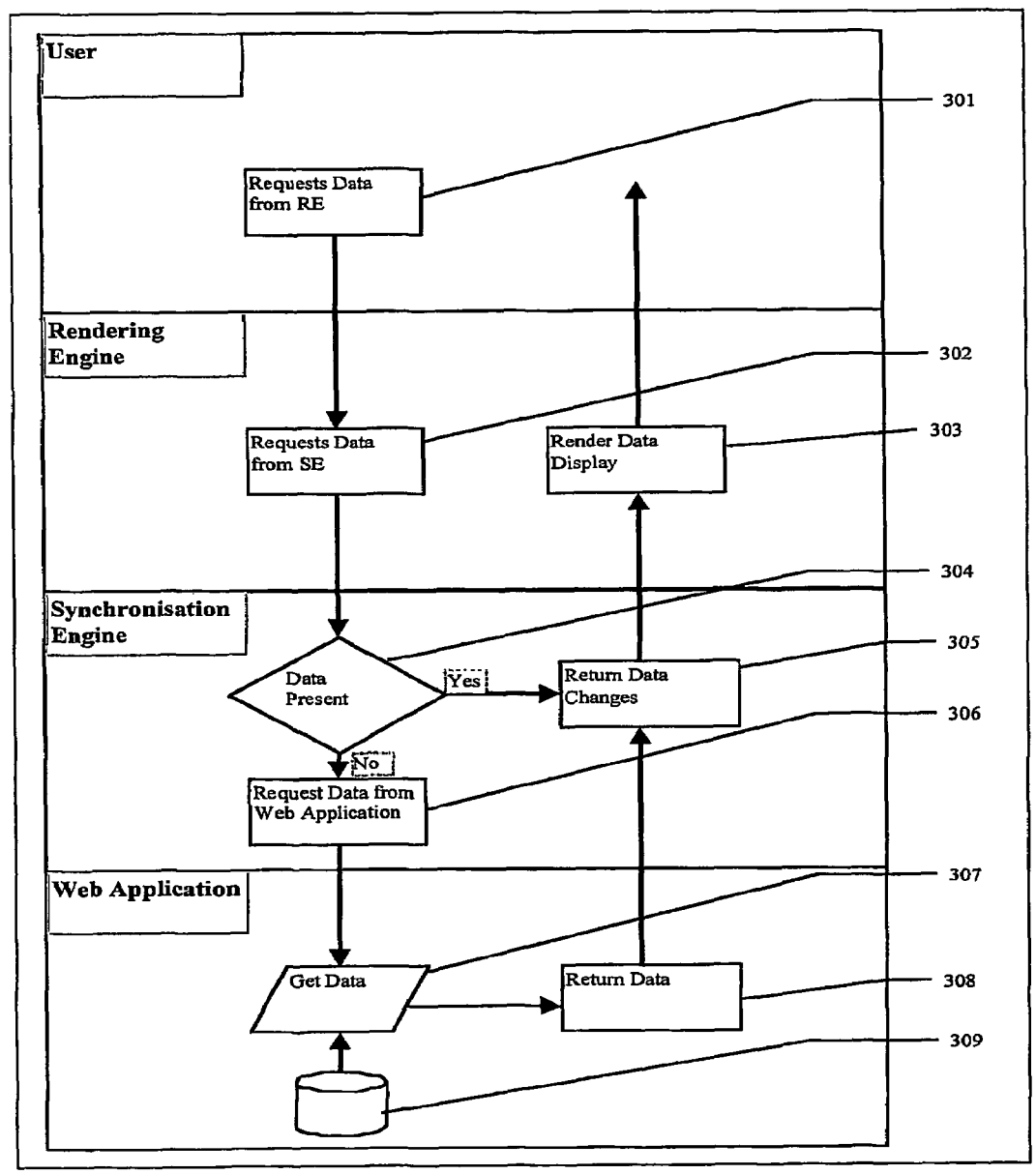
FIG. 3 is a schematic showing the chain of events, which occur when a user does something, which requires additional data.

When a user does something that requires additional data a chain of events takes place as described in FIG. 3. The important step is that the SE can be configured to be an intelligent cache of web application data 304, thereby reducing the load on the web application itself. An example of this would be a news server. If the SE already has the requested news article then it doesn't need to interrogate the web application. The SE can also be configured to only return changed data therefore reducing the amount of data sent 305. The SE uses a timestamp mechanism to ensure that a client connection only receives "new" data changes.

ALC Configuration

Figure 4:
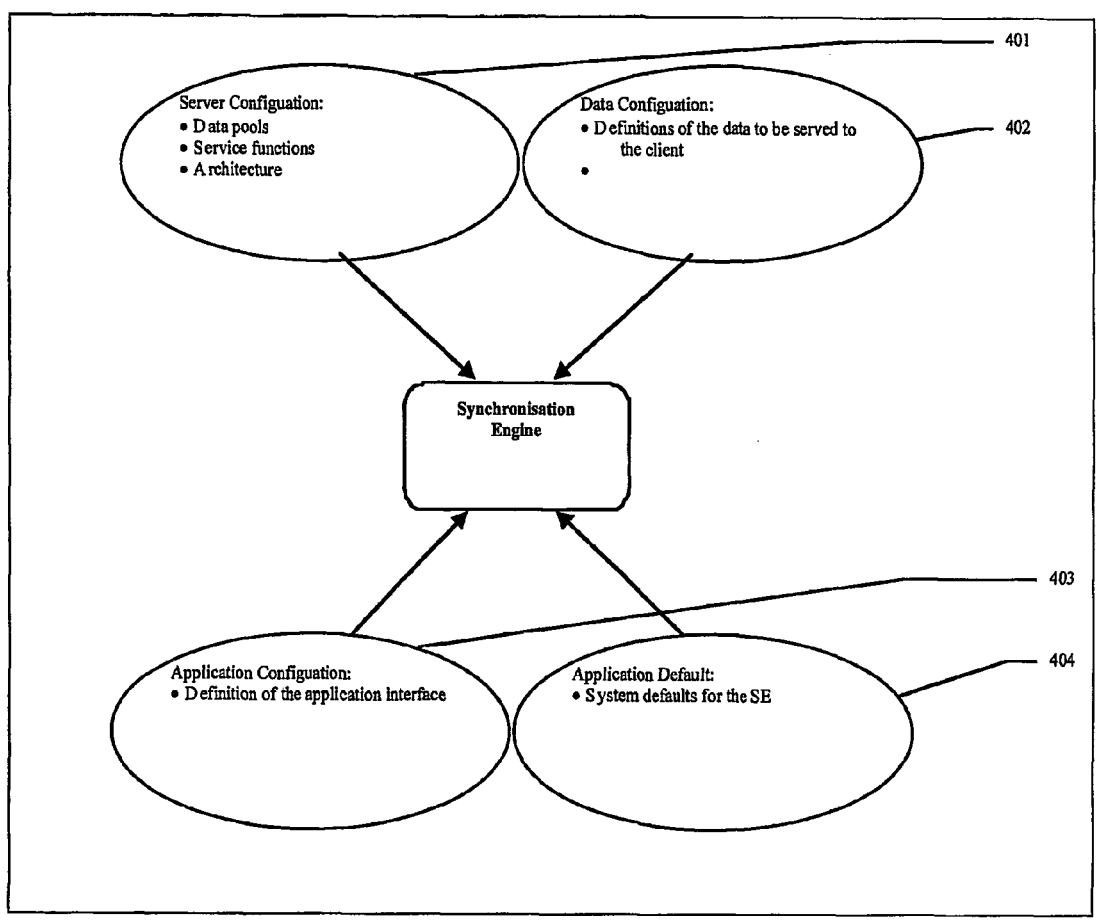
FIG. 4 is a schematic of various aspects of the ALC configuration.

The ALC is totally configured with the use of industry standard XML. There are a number of aspects to the configuration:

Interface definition
Data Definition
User Preference Definition
Communications Definition Referring to FIG. 4, the interface definition 401 defines how the application will be rendered by the client in terms of windows, controls, images etc. This is initially defined for the application but then may be modified to take account of the user's specific configuration. The data configuration 402 defines the data to be served to the client. This is the XML definition of data that will be stored in the data section of the XML Desktop database. (The User Preferences 403, allow user specific requirements to be created and stored in the SE. These can then be used the next time the user logs on.

The Communication Definition will define how the ALC should interface with the SE in terms of the underlying protocol. Typically this would be HTTP Streaming or Polling.

E. ALTIOLIVE

Synchronisation Engine (SE) Details

The Synchronisation Engine is a software application that can co-ordinate and control the interaction between multiple clients, multiple web applications or server data sources and multiple communication protocol types, while still being configurable via industry standard XML.

Some unique features of the SE are:

The ability to interface with existing web applications using a variety of protocols, including conventional HTTP, JDBC, SOAP, Socket; and JMS;
In built scalability to support large numbers of simultaneous clients and to keep them synchronised with each other and the web application;
In built fault tolerance through parallel clustering of SEs;
The ability to plug together multiple SEs and allow them to discover each other and their data sources;
The ability to decouple the refresh rates of the web applications and clients;
The ability to communicate with a number of different client types, for example Internet browser, WAP phone, Personal Information Manager;
Ability to pull together multiple web services;
The ability to transport XML data elements to targeted destinations.

An SE is composed of a number of components:

A network server machine;
A server operating system;
A communications protocol stack;
A Java™ virtual machine;
The SE Java servlet control programme, These components are further described below:

The SE would be located on a network server machine. Typically there would be a CPU, random access memory, permanent disk storage, ports for communicating with other servers on the local network, a manual input device and a display unit. Once the server was set up it would generally be administered remotely via the comms ports, in which case the keyboard and VDU might be removed.

The server is designed to run an operating system that is stored on permanent disk and is loaded into memory at start-up. The operating system would typically be Windows NT™ or Unix™ or Linux™, but could be any operating system that can support Java™ Servlets. To communicate over the local/wide area network the server would require a communications protocol stack such as TCP/IP.

The software to control the SE would also be stored on permanent disk within the server and would also be loaded into memory as required. All the configuration information for the SE controlling software is stored as XML.

Communications

A key aspect of the SE is communications. The SE is able to communicate with back-end applications, with front-end clients and with other SEs. It can communicate at a number of different levels and in a number of different modes. At the lowest level the SE controlling software will need to know the network protocol by which it needs to talk to each client and application. For communication to backend applications this could be HTTP, JMS, SOAP, Socket, or JDBC. Communication with the clients will typically be across the Internet and would therefore be over HTTP, but in some scenarios could be over TCP/IP or UDP. The SE will need to know the network address of each communications partner, for TCP/IP this would be the IP Address or the server name which this then translated into a TCP/IP address.

SE Configuration

The SE would be configured from a number of XML configuration definitions. Referring to FIG. 4, the server configuration 401 defines what data pools are going to be available and the definitions of the service functions required to interact with the web applications that are enabled through the SE. The server configuration also defines the architecture of the SE in terms of clustering, security and communications.

The data configuration 402 defines the data to be served to the client. This is the XML definition of data that will be stored in each of the data pools. Each data pool is a transaction log, which tracks changes to the data set(s) held in the client.

The application configuration 403 defines how the application will be rendered by the client in terms of forms, screen, images etc. This is initially defined for the application but then may be modified to take account of the users specific configuration.

The application default 404 will store system defaults such as refresh rates and other variables. These will be set at start up.

Data Interaction

Once communications are established between the SE, clients and web applications, the SE will need to transfer data between them. This can be by a number of methods:

Push—This is where the SE propagates data to all parties that require it. This is used to keep the clients in sync with web application data changes. Web applications can also be setup to push data to the SE.

Pull—This is where the SE polls for the latest data, on a time basis or on user instigation. The client can also pull data from the SE. An example of a "Pull" is how changes to data on the web application are propagated back to the web client via the SE. Typically a web page is only refreshed when the user requests one and when it is refreshed all the data is transferred from the server even if it hasn't changed. The SE introduces a number of alternatives depending on the application requirements. The SE can be configured to check for changed data at different time intervals 404. If the SE detects a change 408 independently of a RE (Rendering Engine/Layer) request 402, then it can either cache the change or push it to all clients who currently require it. Changes would only be able to be pushed to the RE if a suitable communications protocol was in place such as HTTP Streaming, TCP/IP or UDP.

Simple Configuration

Figure 5:
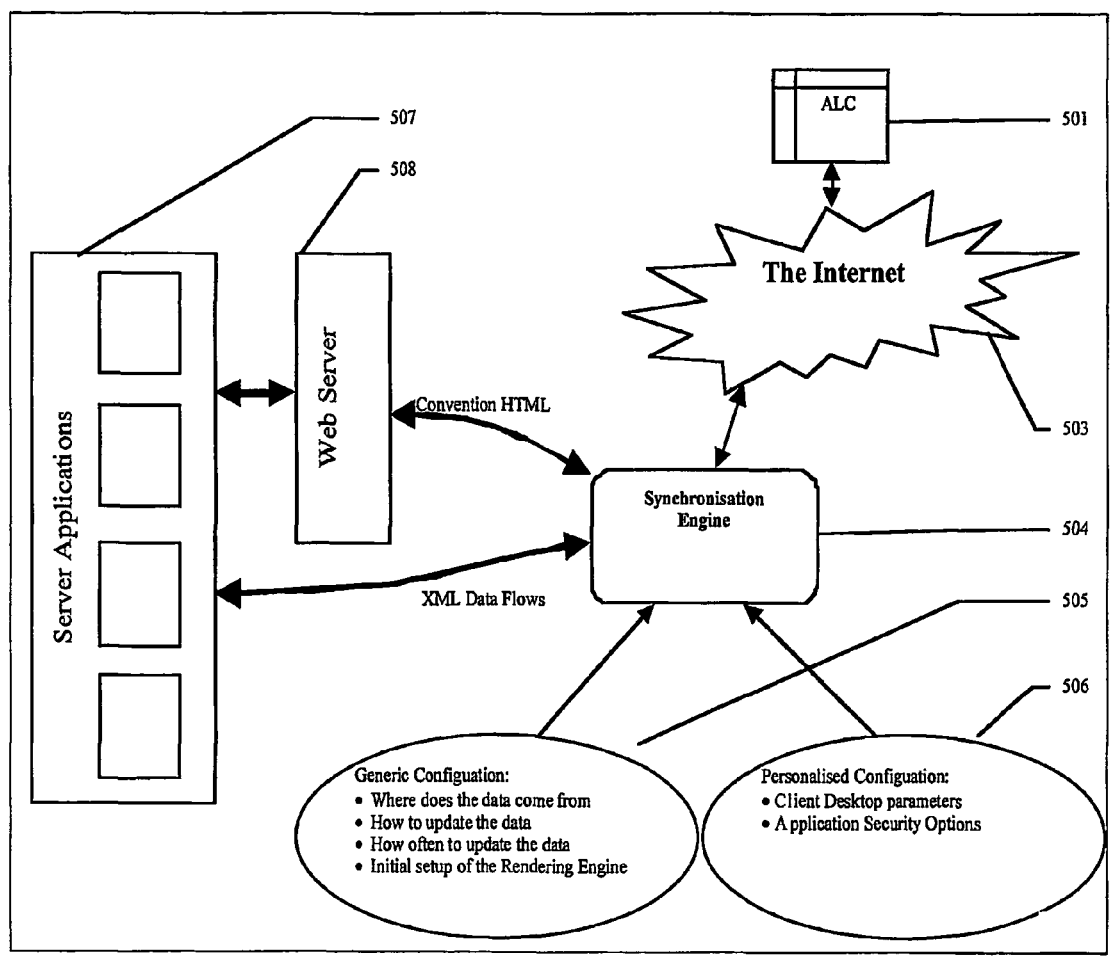
FIG. 5 is a schematic of a simple Synchronization Engine configuration.

The first embodiment of this invention, Synchronisation Engine Simple Configuration, is depicted in FIG. 5. This figure shows the simplest configuration consisting of one SE server 504 which would be connected to a number of applications 507 and optionally the web server 508. It would also be connected to the Internet 503.

Complex Configuration

Figure 6:
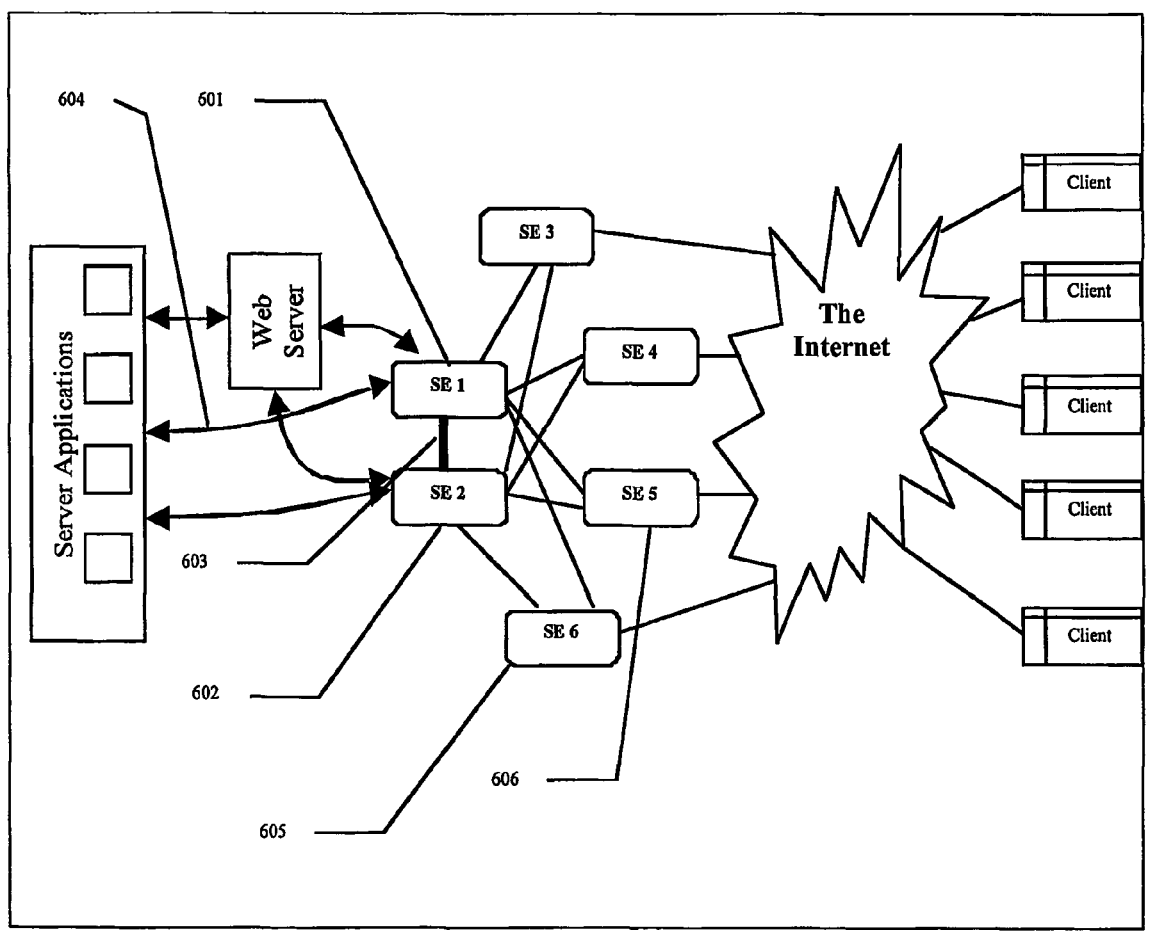
FIG. 6 is a schematic of a complex Synchronization Engine configuration.

FIG. 6 demonstrates how multiple versions of the SE can be pieced together to form a scalable and fault tolerant network. This can be done without any code changes and with minimal configuration changes and the configuration that is required is all via XML. The SE system can be deployed many times to produce a hugely scaleable and fault tolerant system. In this embodiment there are two main SEs 601 & 602, these would act as dual redundant servers providing a high degree of fault tolerance. Each SE would have independent links to the source applications 604. The SE invention embodies code that will allow these servers to keep themselves fully synchronised 603.

This approach provides a large degree of scalability by allowing the SEs to be setup in a snowflake configuration. The two main SEs, 601 & 602 would act as the hub and would then be connected to other SEs 605 & 606 etc rather than directly to clients. Each one of these satellite SEs could then be linked to a large number of clients. The SE invention incorporates the propagation logic required to service this complex snowflake configuration.

More SEs could be setup in parallel to provide additional resilience and scalability. Also the snowflake configuration could be extended to have many layers thereby giving near infinite scalability. Although in the above-described embodiment, the client was based on a web browser, it would be possible to have other types of user interface such as a Wireless Application Protocol (WAP) phone or a Personal Information Manager (PIM). The SE can also be split over many Central Processing Units (CPUs) within the same server or over many servers.

F. DEPLOYING ALTIOLIVE

The generic applet must be configured so that the XML database layer on the client displays the correct data for a particular user, in the correct format and with window controls appropriate to that user, and in an optimal manner for the display capabilities of different client devices. The APS has responsibility for configuring the generic applet. This is achieved via the XML Deployment Package (XDP). XDPs contain the definitions for the following AltioLive elements:

1. Service Functions—define the data (XML data & related Image data) available to users from the Web Application and the mechanisms available to update the Web Application.

2. Data Pools—define the mechanisms for live distribution of XML data updates to users.

3. AltioLive-Views—define the live interactive user-interface delivered through the AltioLive Client. There can be multiple views according to user roles.

4. Pervasive-Views—define the page-rendered user interface delivered through the Pervasive Client. There can be multiple views according to user roles and/or device capability.

5. Data-Views—define the data and access available through the Data Client for a DHTML user interface.

6. Common elements—icons, desktops styles etc. for use across views within the XDP. XDPs can be developed as self-contained entities. Typically a self-contained XDP is used where the views are tied to a specific Web Application e.g. a contract resource application could provide a requirement-view, a resourcing-view and a phone-based timesheet entry-view. Self-contained XDPs are also used in delivering third-party components (e.g. a Chat or e-mail component) that are effectively 'plugged-in' to application-specific XDPs. XDPs can also make use of definitions from other XDPs to define their views. Typically this is used where the views merge XML data from many applications into a specific role-based view (e.g. a salesman sees a cross-system-view combining sales tracking data, customer management data and credit control; the sales director sees a view combining aggregated sales data, personnel monitoring and campaign performance data) or to use elements of a third-party XDPS are developed within the AltioLive Development Edition (ADE) and then registered with the APS using the SE Admin Tool. This distributes the XDP across all Synchronization Engines in a cluster to make it available to users.

G. SECURITY ASPECTS OF ALTIOLIVE

AltioLive combines best-of-breed security technologies and practices to ensure a flexible, configurable and comprehensive security architecture for all applications. AltioLive is designed to integrate within existing security frameworks. It takes advantage of existing session management and Secure Socket Layers and provides unique additional security features to offer a robust and highly secure environment for all systems.

User Authentication

In AltioLive, users do not directly log-on to the APS. AltioLive intentionally reuses the session object created in the web server/application server in order to let you take advantage of:

existing authentication policies for the application;

best practices in user authentication;

and the existing investment in technology infrastructure

When the end-user accesses the application through a host Web page, this page downloads the appropriate Client from the same web server. The Client then contacts the APS, which uses the existing session object (on the server) to determine the specific View and XML data to be served to the user. Even if the URL of the host Web Page is known, the user cannot activate their connection with the APS unless they already have a valid session (including the necessary AltioLive specific variables) on the Web server. Using the existing session from the Web server also prevents users from having to re-authenticate as they cross boundaries in a distributed system. AltioLive allows users to authenticate only once, regardless of the machine on which the application is deployed. To control who can connect to the APS, AltioLive leverages existing application servers' ability to enforce rules that govern whether a connection should be established based on client IP access or protocol. This allows companies to decide if "Client" refers to AltioLive Client, AltioLive Pervasive Client, and the AltioLive Data Client Unique User Views and Data Pools Individual or groups of users can be assigned different views/windows, which can be populated by data specific to each group's or individual user's need. Groups and/or individually registered users can subscribe to different data pools in the APS. Users only see the data to which they subscribe. In this way, AltioLive prevents unauthorized users from seeing sensitive data as well as allowing for unique user experiences/views. Through the APS, system administrators can control which users see which data to ensure only the right data reaches the right users. For example, views could be configured for different roles in an organization (i.e. Salesperson, Sales Manager, Credit Controller etc.) that provide access to a number of backend systems—each role would have a view that restricts what functions are available and deliver only data that is relevant to their role. Specifying individual access levels through the APS allows production systems to be up and running very quickly with minimal configuration and no coding.

Firewalls

Use of standard HTTP and HTTPS connections between the Client and the APS makes the technology transparent to most firewalls and does not require any relaxation of existing security policies. In highly secure environments where connections are restricted, the Client/APS connection is specific and easily added to the allowable list of sites. An additional option for system administrators is to locate departmental slave (APS) servers that sit inside the firewall to support one or more users (who therefore no longer have to connect to the Internet). The slave server has a dedicated peer connection to its master APS that can be additionally secured according to company security policies Connection Security Not only is it important that users are properly authorized and authenticated when accessing data from the APS, but also that this data cannot be viewed while in transit. To avoid eavesdropping on connections between any connections to the APS, AltioLive offers users a number of security features:

Client to/from APS

AltioLive includes support for a Secure Sockets Layer (SSL) and digital certificate implementation that provide authentication and privacy via encryption in distributed APS applications. The Client/APS connection takes advantage of current SSL technology including 56 and 128 bit cipher strength connections. AltioLive is compatible with certificate authorities that support X.509v3 certificates. This means that developers are free to use the vast majority of certificate authorities available today.

In secure operation, the APS requires a digital certificate to be able to prove its identity to Clients and other servers. When a Client contacts the APS using SSL, they first request the server's digital certificate to prove its identity. Once the Client receives the server certificate, identity is assured, and the Client and APS can confidently send data back and forth across the network. For highly secure environments, many installations need to also authenticate the Clients accessing the APS. For this reason, the APS SSL installation can be configured to also provide authentication for Clients and Web browser. This is called a two-way authentication and incorporates the same digital certificate verification process. The major difference for two-way authentication is that the digital certificates are located in both the Client and the APSs. Once certificates have been exchanged and mutually verified, both the Client and the APS can trust the identity of the other. Furthermore, once mutual authentication has been set up, a private channel can be created between the two hosts consisting of encrypted data. Many systems will also require that the data which the Client receives from the APS and vice versa to be secure/encrypted. SSL allows both the APS and the Client to encrypt the data exchanged between them. Potential hackers acquiring the data in transit are therefore unable to understand it. Streaming data connections are designed to make efficient use of secure connections to reduce server load as opposed to regenerating cipher keys for every request. Use of compression techniques on the data stream further enhances security while reducing the overhead of encryption on the overall system. Both the Client and the APS monitor connections to detect loss of connection. Clients' connections can be configured to either fail-over to another APS or require the user to re-establish their session through a login.

APS to/from APS

The APS can be clustered for load balancing in master/slave relationships (as well as peer-balanced relationships). These connections are effectively point-to-point connections that can use HTTP, HTTPS or socket connections to secure the interface. If the APSs are distributed in geographically different areas (not in the same data center behind the same physical firewall, for example), the SSL protocol provides secure connections by allowing these APSs to connect over the Internet and authenticate each other's identity and by encrypting the data between the APSs. For security above SSL hardware encryption can be used on the specific connection between servers. All APSs accessing the cluster must be pre-registered with compatible license keys, which prevent spoofing of any of the servers.

APS to/from backend Web Application

The backend Web Application and the APS are usually in a closed and physically secured environment to prevent direct access to backend data from any outside client device. For implementations where the system connects across the Internet to external Web Services, SSL and digital certificates provide the necessary authentication and data encryption to ensure that the Web Service is a proper entity and all data transmitted is only decrypted and viewed by the intended recipient Reliable Data Delivery Data integrity and delivery is assured through a combination of HTTP generated exceptions and the APS/Client timestamp mechanism. All messages from the APS to the Client are time stamped and sent across the network using HTTP(S). Data from the APS is sent to the Client using HTTP. Should a loss of network connectivity or a temporary hardware failure cause any data not to be received by the Client, the built-in handshaking in the HTTP protocol generates an exception. Essentially, if a message cannot be sent from the APS, the TCP/IP protocol generates an exception. This is generated in the server's Java Virtual Machine (JVM) and the exception is handled by the APS. The APS closes the connection upon receiving an HTTP exception. The Client will automatically reestablish the connection with the APS (the reconnection strategy is configured through AltioLive Tools). When the connection is re-established, the Client requests all updates since the last timestamp that it successfully received, guaranteeing delivery of all messages in the correct sequence. For streaming data to the browser, the Client is just listening for data updates. In the case where it does not receive any updates or a probe message in a configured interval, it will start its re-connection process to the APS. In the meantime, the APS will generate an exception when the probe message cannot be sent Transaction Authentication To prevent an unauthorized user submitting a transaction it is common to use forms of transaction authentication. This takes the form of access security/signature software on the client (sometimes even coupled to physical security—e.g. card swipe, challenge/response devices etc.) can add a security signature to any transaction. The AltioLive Client can be configured to call-out to such applications before submitting transactions to the server to either append the signature or encrypt the whole transaction.

Use of Shared Workstations

Unlike many solutions, the Client does not store any information locally on the workstation (configuration, data or even images). This means that the user can safely access their application from shared/networked platforms without worrying that their data is accessible by others when they have logged-off. This is a key issue in the access-anywhere features of Altio's technology. Standard session time-outs can be used on the server to time-out inactive sessions. The Client can also be configured to disconnect on logout and/or moving from the host page to prevent someone using the Back/Forward functions of the browser to reactivate the application (if it hasn't already timed-out).

Data Available to the User

The data available within the XML Desktop and visible to the user is configured at design time and enforced by the APS. Users cannot configure their Client to access additional data not presented to their specific View.

Protection for the User

For the end-user, the Client is implemented within the standard Java 1.1 Security model. AltioLive Clients therefore do not have access to local data or services on the end-user's system and developers cannot undertake bespoke development to override the functionality of the Client. As an option, the Client can be 'signed' to give end-users additional comfort that the software can be trusted for use on the specific application.

A Complete Security Architecture

In addition to all of AltioLive's security features, companies must also ensure that they secure the general environment in which AltioLive is deployed. Such precautions include:

Securing the operating system: No security hole in the DNS, sendmail or any other potential entry points.

Securing File System: No general access to sensitive configuration information

Securing Network: Use of firewalls and VPN

Securing Physical Environment of the Server(s): Only authorized personnel have physical access to system Separating Development and Production Systems No Source Code Available on Production System The combination of real desktop-like functionality in online systems that users can access from anywhere, and the Internet becoming a proven and reliable medium for mission-critical communication is now driving companies to rapidly build new systems online as well as migrate existing systems to pure Internet Protocol-based applications using software platforms like AltioLive. Companies deploying IP-based applications must take special care that implementations are done in a secure and highly reliable environment to protect the substantial capital commitment required to build or to migrate any application online. AltioLive is designed to take advantage of existing security frameworks, such as session management, user authentication and Secure Socket Layers, reliable data delivery and transaction authentication, and it provides additional unique built-in security functionality to offer the most robust and highly secure environments for developers and end-users at a fraction of the cost and time of alternative techniques.

H. BENEFITS OF USING ALTIOLIVE

With its XML based architecture, AltioLive eliminates all the challenges posed by HTML, JavaScript and Dynamic HTML in the development of Internet applications.

Specifically, AltioLive provides companies the following benefits:

Increased User Functionality: AltioLive provides a client/server-like environment directly inside the browser, giving users the same power as they have in traditional offline client/server-based systems. With AltioLive users have all the data they need at their fingertips in real-time, allowing the functionality in the system to be richly interactive. Graphs, drag-and drop, sorting resizing and dynamically changing data are all available to users right inside the browser.

Enable Data delivery Across Devices: AltioLive allows end-users to access Web applications from any Internet enabled mobile device (including Palm, WinCE, WAP phones, and Web TV)—freeing them from the traditional PC-centric Internet experience. AltioLive applications can be deployed almost anywhere as they are based on pure XML and can be 'tuned' to meet people's various needs.

Savings on System Development: Using the AltioLive Designer tool, developers drag and drop lists, graphs, buttons, images, and design windows with the use of their mouse. There is no coding required to develop the front-end, and only minimal coding for the connection between the front-end and the back-end. This frees up precious programming resources to focus on building business logic rather than tedious and error-prone HTML AltioLive significantly shortens development cycles, to enable faster time-to-market with considerable cost savings. Companies using AltioLive for large development projects have seen as much as 90% time and cost savings, equivalent to more than a million dollars in upfront cost.

Savings on System Maintenance: Since there is no code to be written for the front-end by the developers, AltioLive eliminates the chance of bugs through human error. Changes to the front-end can be implemented immediately using the AltioLive Designer tool. Connections from the client to back-end servers are also handled by AltioLive and while some of the integration requires actual code from developers, most of the tasks are automated by AltioLive. AltioLive reduces bugs and eliminates the need to have significant IT resources or consultants on hand whenever changes have to be implemented.

Savings on Bandwidth: AltioLive pushes data across the network only when the data actually changes. Even then, it only sends across the data that needs to be updated, not entire pages, tables, graphs or windows. Consequently, AltioLive-based systems substantially reduce the bandwidth used, saving companies substantial money on their bandwidth charges.

Fast Performance: AltioLive-based systems deliver the initial data set in compressed form to the client. Users immediately see any updates to the data as it changes from the back-end as well as when they make any modifications themselves through the client. Most of the data will initially not travel over any network to a database for processing, but instead reside on the client available to the user. The proximity of the data to the user gives faster performance than most client/server-based systems; it performs like a thick client Ability to Prototype New Features: With AltioLive it is easy to develop and prototype new features and make incremental changes. There is no coding involved when using the AltioLive Designer tool with XML-based Web services. The user interface, the logic between the different windows and the connection to the back-end servers can be configured by the business person who will actually be using the system.

Customized and role-based views: Multiple views can be easily created for an application (e.g. basic vs. advanced or manager vs. employee) and be automatically distributed by individual or role.

White Label Applications: The look and feel of an AltioLive application is determined by 'skins' that allow very fine control (at the pixel level) of how applications look in the screen. The AltioLive Designer tool can tailor applications for a number of customers (i.e. incorporate their logos, borders etc.) to provide users with a uniquely branded experience.

Secure Systems from Hackers: AltioLive provides secure communication through standard SSL (Secure Sockets Layer) and HTTPS with the Web server or application server doing the encryption and decryption in the server, and the browser doing the same on the client side. Additionally, the AltioLive applet runs in a carefully protected 'sand box' environment on the browser, preventing any ability to read/write to the hard disk drive on the computer. AltioLive-based applications can be used from public locations, such as net cafes, libraries etc. because it is as harmless a plain HTML page and leaves no data cached behind.

Less Load/Stress on Back-end Servers: Changes to data in the database are pushed out to the client in real-time, but only when changes occur and only the changed data is updated (not the whole window). This eliminates the need for users to constantly refresh the screen and make calls to the database on the back-end, which today causes heavy load when numerous users access the system. As users modify the data and submit new data back to the database, system administrators use the AltioLive Application Manager to configure how often this data is sent back to the database. This effectively allows system administrators to tune the system for optimal performance. Companies using AltioLive have reduced server load by as much as 90%. Since AltioLive decreases the stress on the back-end servers, implementations require less servers, or at least less CPU-intensive servers, which reduces hardware costs by thousands of dollars. Additionally, as most software Licenses are based on hardware CPUs, significant savings come from reduced software license fees. With certain enterprise software License fees approaching $75-100,000 per CPU, a reduction of even one or two CPUs could save a lot of money.

Ability to Implement Changes Quickly: AltioLive allows companies to instantly make changes, small or large, with virtually no coding on the client and only limited coding on the connection from the client to the server. This ability allows companies to adjust their systems on demand, rather than leave them with less than adequate functionality as business requirements change.

While the invention has been described with reference to the preferred embodiment thereof, it will be appreciated by those of ordinary skill in the art that modifications can be made to the structure and elements of the invention without departing from the spirit and scope of the invention as a whole.

I. GLOSSARY

Altio Presentation Server (APS)—The operational platform for delivering live XML data to users through the Altio clients.

AltioLive Client (ALC)—Client that delivers a windows style live interface within a browser.

AltioLive Pervasive Client (APC)—Multi-device client that renders onto devices such as WAP, Web TV, PDAs.

AltioLive Data Client (ADC)—Data-only client (i.e. no presentation) for use with dynamic HTML user interfaces.

A 'client device' is any device which can be controlled over a network and has some means by which a human can view and/or interact with it. It could be as simple as a network controllable light bulb and switch or more complex, such as screen & keyboard based personal computers. Software on the client device can be embedded or installed onto the device or delivered on demand to the device over a network.

A 'data source' is any source of data potentially relevant to a network based application and includes basic data feeds (e.g. news headlines, equity quotes, sensor measurements) and more complex enterprise applications (e.g. Client Relationship Management, Human Resources, Enterprise Resource Planning and Accounting systems). Any 'data source' can also be independently or simultaneously a 'data receiver' and accept structured data and commands from the presentation server.

Domain Name System (DNS)—The Domain Name System (DNS) is an Internet directory service. DNS is used to translate between domain names and IP addresses, and to control Internet email delivery. Most Internet services rely on DNS to work. If DNS fails, web sites cannot be located and email delivery stalls.

HTTP Hyper Text Transport Protocol—A request-response type protocol that specifies that a client will open a connection to a server then send a request using a very specific format.

HTTPS Secure Hyper Text Transport Protocol—A request response type protocol with encrypted data using Secure Socket Layer (SSL)

Java Virtual Machine (JVM)—A self-contained operating environment that behaves as if it is a separate computer. For example, Java applets run in a Java Virtual Machine (VM) that has no access to the host operating system.

A network based application is any application that can run over a physical or virtual network and where the client device is generally independent of the data source. A 'networked based application' includes configurations where the network is virtual (e.g. both the 'presentation server' and the "client device" are on the same physical machine), or where the 'network' is established on occasion (e.g., as would be the case for many synchronizable handheld devices).

SE Admin Tool—An in-browser tool to administer and monitor Synchronization Engines.

Synchronization Engine (SE)—The server-side component that integrates AltioLive with Web Applications and delivers live XML data. View what a user sees and interacts with in AltioLive-based applications—i.e. their interface to the application.

Virtual Private Network (VPN)—A VPN is a private connection between two computers to transport private data over a public network like the Internet A VPN offers encryption, tunneling, authentication and access control effectively preventing data being intercepted in

APPENDIX 1

"Getting Started with AltioLive" from Altio Inc.; Chapter 3 Titled 'The AltioLive Presentation Server'

In this chapter we will look at the AltioLive architecture and learn more about how the ROS demonstration application was created.

Figure 7:
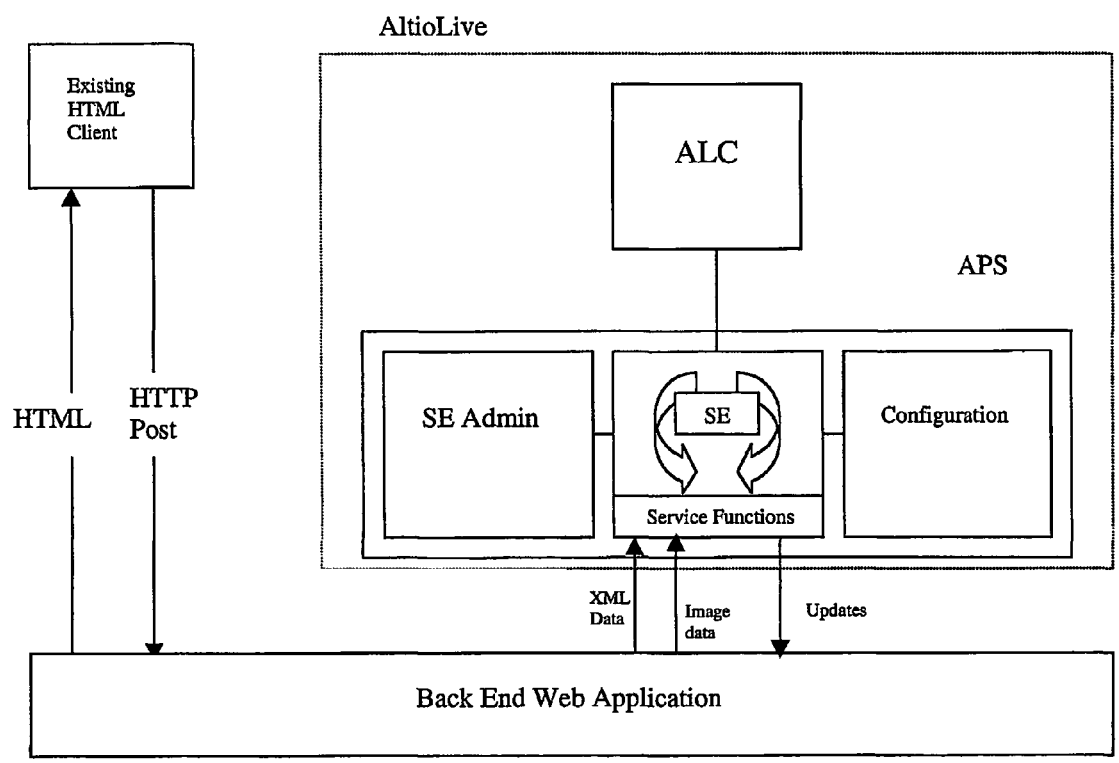
FIG. 7 is a schematic of the AltioLive Deployment Architecture.

AltioLive applications are deployed through the AltioLive Presentation Server (APS). This integrates with a back-end application (that could be supporting an existing HTML interface) and also supports the AltioLive Client In FIG. 7 one can see the comparison between traditional HTML applications and AltioLive's technology. The deployment architecture has a number of key components:

AltioLive Client—a small footprint Java applet that runs within browsers supporting a Java Virtual Machine (v1.1 and above)—i.e. Microsoft Internet Explorer 4 or better, Netscape Navigator 4 or better.

Synchronization Engine—Java servlets that maintain the communication between one or more back-end applications (through Service Functions) and the AltioLive Client. The Java servlets operate in a Java 1.3 servlet environment, and support JSDK 2.0 to allow for installation on common Application Servers.

SE Admin—a browser-based tool used to configure and monitor one or more clustered Synchronization Engines.

Configuration—XML files and images that configure the application interface presented in the AltioLive Client; XML files to configure the Synchronization Engine.

In Operation

The end-user logs on to the site and accesses an HTML page (called the host page). This reserves space for the Altio Desktop on the page, and references a small footprint Java applet (the AltioLive Client).

The AltioLive Client requests the Synchronization Engine to serve its View—an XML definition of the look, feel and operation of the user-interface. If the Synchronization Engine is not already running, it will read the server configuration file (altioserver.xml) to initialize itself.

Using session parameters, the Synchronization Engine determines which AltioLive application and View the user is trying to access. It creates the xml definition of the View by combining the View definition file (appview.xml) with any retained preferences (e.g. window positions) from the user's last session. If the View refers to system images (e.g. skins, buttons etc) then these are also served to the client so that it can render the interface to the user.

Note that the Sync Engine cannot initialize the back-end application; it assumes that any back-end application is already running.

Service Functions and Data Pools

While requesting the View, the AltioLive Client also requests the initial data to populate the client-side XML Desktop. At this stage the Synchronization Engine loads the application configuration file (altioapp.xml) to create the service functions and data pools required to serve data to the View. Using the View's initial data definition file (app-veiw_data.xml) the XML data is requested from the back-end application (via Service Functions) and served to the client.

Service Functions can use either an HTTP connection, or be implemented using Java Messaging Service (JMS).

As part of its Application Configuration, the Client requests the Application Images (i.e. backgrounds, button images, icons and skins), which are served from the Sync Engine. These can be packed into composite image files to minimize download time.

At the same time the AltioLive Client is subscribed to any Data Pools so that they receive relevant updates to the initial data set. Data Pools are shared across clients, and track changes from the initial data sent to each client Data Pools collect updates from the back-end application ether by polling to a URL at regular intervals (HTTP polling) or by having updates streamed through JMS, an HTTP streaming connection, or Socket (direct connection). This is configurable per Data Pool.

Independently to the Data Pool configuration, the Client can receive updates by regular polling or through HTTP streaming (note that some browsers do not support streaming connections). The user can submit updates through the Client. These are mapped onto Service Functions issued by the Synchronization Engine, which in turn submit the updated data to the back-end application. These update methods can map to existing HTTP post methods on the back-end application if available.

Every Data Pool must have a service function associated with it to provide initial data; however the reverse is not necessarily true, as some service functions will provide static data, which is not expected to change during the user's session.

If there are images that are data related (e.g. thumbnails), then the Image Data is requested from the back-end application when the Client requests it, via image-specific service functions.

User Preferences

If the user changes the state of their desktop (window positions, state) the changes can be optionally posted to the Synchronization Engine and saved locally or on a shared store (e.g. in an external database through a JDBC connection). This allows the users desktop to be restored when they next log in. This setting is made in the Sync Engine for all applications.

The ROS Demonstration

Firstly, there is no specific back-end application installed. The demonstration is built entirely using the AltioLive Developer Edition and takes advantage of the bundled AltioLive Development Prototyping Kit (ADPK). This simulates the back-end application through its:

Login handler—used to create the session when the user logs on, and serve the AltioLive application host page (called AltioLogin).

XML Database—a general-purpose configurable in-memory XML database (called AltioDB) that accepts scripted updates (hence the ability to create dynamic price changes) and persists data to flat files (hence any bids you have made reappear when you next log on).

Logging-On

When you select the demonstration option, the login handler generates the log-on screen. When you log on, the login handler creates a session object with specific tags to identify the application and the View. In this case ros (which you typed in as Application) is the application and the View is preconfigured in the Login Handler to roslive for all users. Once you've logged-on, the login handler serves the Richmond Office Supplies Host Page (roshtml.txt) which in turn defines the space for the AltioLive Desktop and invokes the AltioLive Client The AltioLive Client then connects to the Synchronization Engine, which accesses the session parameters to determine that you are using the ros application with the roslive View.

The Initial View

The Synchronization Engine serves the View file, ros/views/roslive.xml, to the client, which defines:

The open windows i.e. This is AltioLive and Offers and Bids

The three minimized windows i.e. Offers I Watch, My Bids and My Offers For Sale

The windows that can be activated by the user e.g. Create New Bid

The controls on each window and how they are populated with data from the XML desktop.

The event-action rules e.g. open Create New Bid for the selected row in the LIST when the toolbar button is clicked.

If you had previously accessed the View, then it will be automatically modified according to your saved user preferences e.g. window positions and states.

The Initial Data

Figure 8:
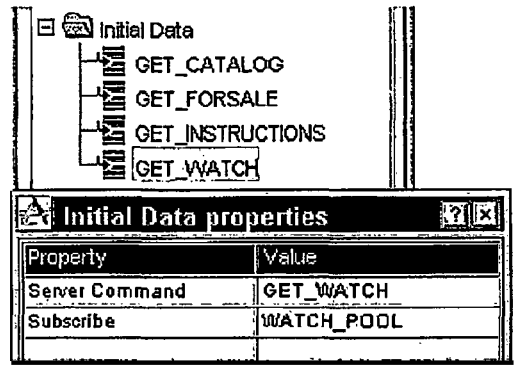
FIG. 8 is a representation of a screen view. The initial data served by the Synchronization Engine is shown in this example.

The Synchronization Engine serves the initial data (to populate the XML desktop) according to the information associated with the View (FIG. 8). This is defined in the Designer, on the View tab, Initial Data node. In this case there ate four service functions used to get initial data. Of these, GET_FORSALE and GET_WATCH both subscribe to datapools.

The Synchronization Engine substitutes the Server Commands for the XML data returned from the Service Function specified in the SVRCMD.

The catalog data is static and so the server command just invokes the GET_CATALOG service function, which returns the XML data for all catalog items (e.g. the product id, description, thumbnail etc).

The items for sale and their corresponding bids, however, need to be updated live in the user interface so you can see new offers or bids or changes to data as they are made. Therefore the include statement not only invokes the GET_FORSALE service function to return this initial data set but also subscribes to the NEW_FORSALE Data Pool so that any updates are streamed to the client. The individual portfolio of items that you are interested in also is subscribed to a Data Pool in order to show you things that you have dropped into the watch-list. More information on this is in the next section.

Service Functions and Data Pools

Figure 9:
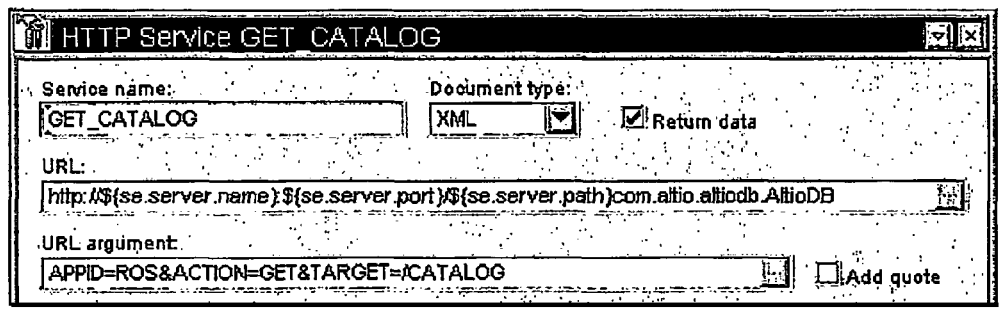
FIG. 9 is a representation of a Service Function.

The application configuration file, ros/altioapp.xml, is used to configure the Service Functions and Data Pools for the application. All service functions in ROS are HTTP-based. An example Service Function is shown in FIG. 9.

This definition states that when the GET_CATALOG Service Function is invoked, an HTTP URL request is executed with the specified arguments. In this case, the target is the XML Database (AltioDB) and the arguments specify that the CATALOG data set should be returned.

Note: Service Functions do not define the format of XML data that is returned and one of the features of AltioLive is that it accepts any valid XML data.

Figure 10:
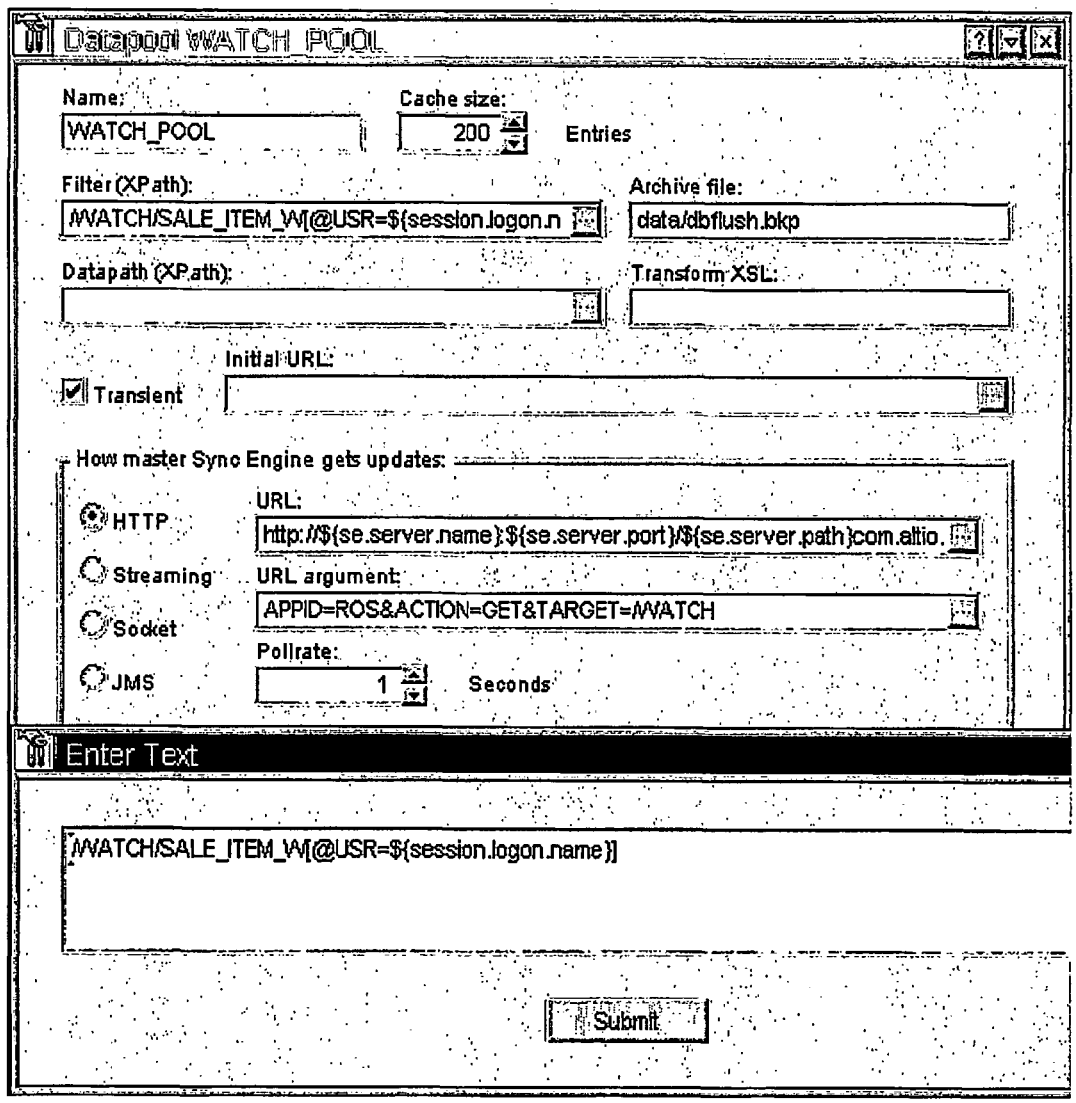
FIG. 10 is a representation of a screen view depicting the Datapool.

The datapool in FIG. 10 is used to get updates of items, which the user has placed, on their watch list. The 'EnterText' field contains the XPath information used in the Filter. (It is only displayed here so that you can see the entire XPath statement used in the Filter). This ensures that only items that the logged on user has added to their list are passed into the datapool. The AltioLive Client uses this to create a personalized watch list. The subscription is filtered by user-id so that the user does not see the items others have added to their portfolios. The predicate @USR=${session.logon.name} syntax controls this. The Pollrate specifies how often updates should be passed to the client, in this case every 1000 milliseconds (1 second).

Submit New Offer

When you submit a new offer from the "Create New Offer For Sale" window you select a product from the list, enter details in the various fields, and click the "Submit" button.

Figure 11:
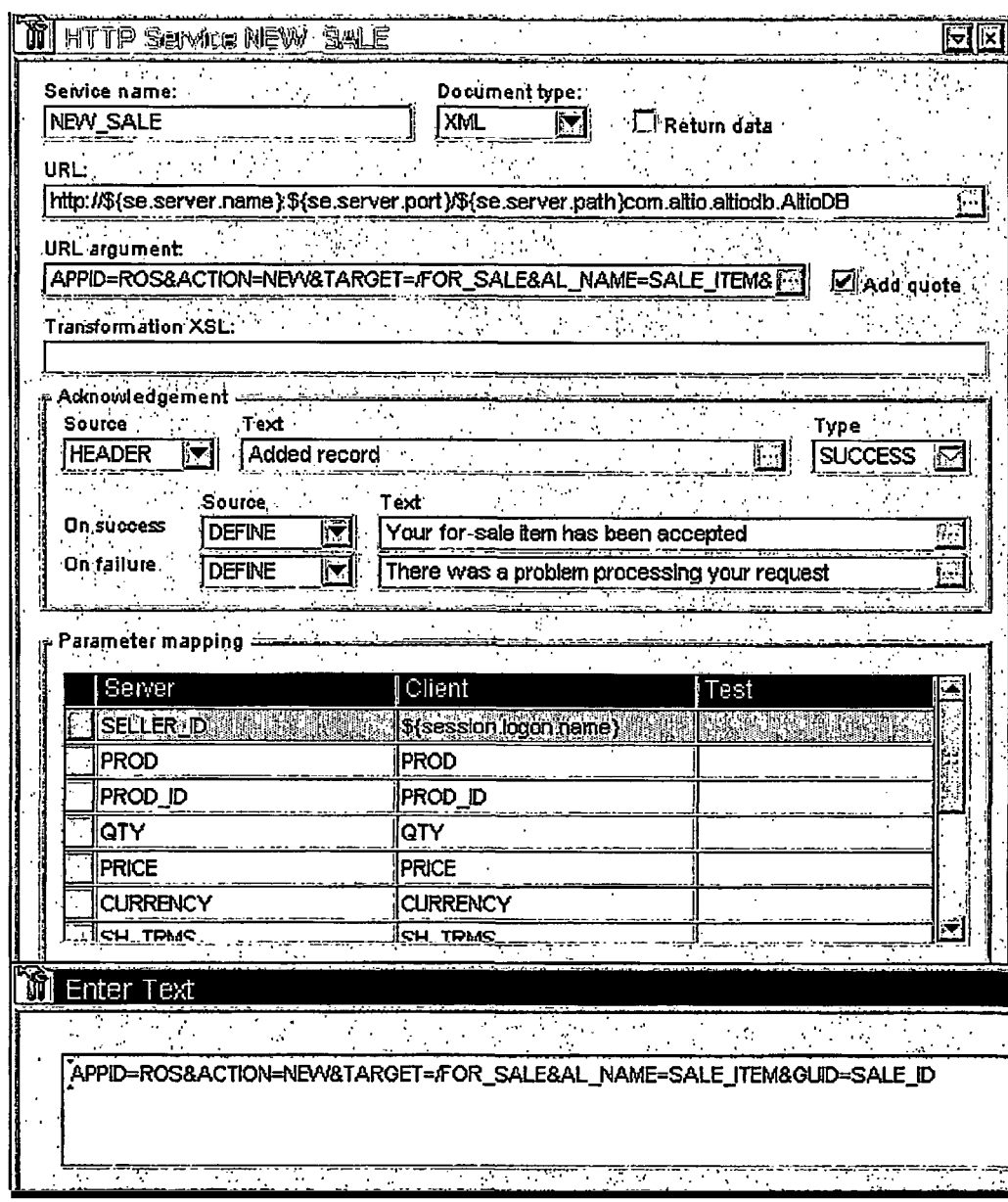
FIG. 11 is a representation of a screen view of a "NEW_SALE" Service Function.

The Submit button has an action rule that invokes a NEW_S-ALE Service Function, as shown in FIG. 11. Again, the 'Enter Text' field includes the full URL argument (which is partially obscured in the upper box). This Service Function creates a new SALE_ITEM element in the FOR_SALE table. Again the target is AltioDB and in the arguments the GUID assigns the unique ID (which AltioDB creates when adding an element) to a SALE_ID attribute. ONSUCCESS and ONFAILURE define the message that you see if the update succeeds or fails. The APP_ID is used to ensure the service call goes to the correct back-end application, and the SELLER_ID is set to the logged on ${session.logon.name} taken from the session parameters. The SRVPARM list maps the named fields in the "Create New Offer For Sale" window to those expected by the back-end application. In this case we have the freedom to use the same names. For example, the data for product is scraped from the control NM="PROD"—the row selected in the "Product" column in the list of products. The Data attribute created by the server in the new SALE_ITEM with this data in it is also specified as PROD.

The SALE_ITEM created by this Service Function will look something like this:

```
<SALE_ITEM SALE_ID="S05" SELLER_ID="Mary" PROD=
"Lever arch"
PROD_ID="ID06" QTY="1" PRICE="11" CURRENCY="USD"
SH_TRMS="FOB" PORT="North Pole" CTRY="SWE" EXP_
DATE="20001022"
COMMENT="Beyond words.">
```

Where you need to create data that is not shown on the window, as is the case with the product ID (PROD_ID), this is achieved by using hidden fields or columns. Thus for the PROD_ID the column is included in the "Select a Product" list but it has a width of 0, and hence is not displayed.

Submit New Bid

Figure 12:
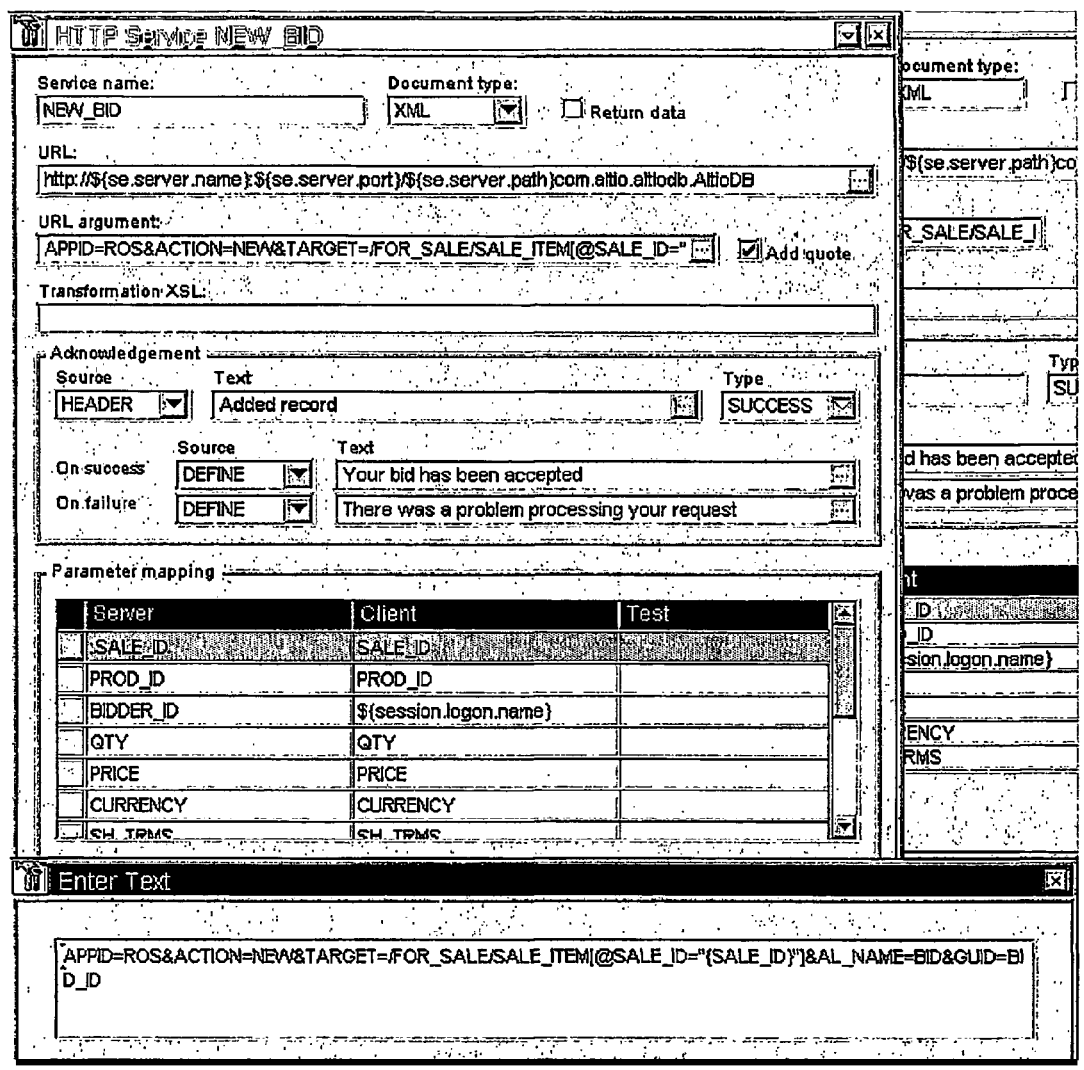
FIG. 12 is a representation of a screen view of a "NEW_BID" Service Function.

When you submit a new bid from the "Create New Bid" window, the "Create New Bid" window shows the details of the "Offer For Sale" item that was selected, and allows the relevant details for the bid to be entered. Once the information is entered in the fields the "Submit" button is clicked. The button has an action rule, which calls a NEW_BID Service Function as shown in FIG. 12.

This Service Function differs from the previous example (NEW_SALE) in that the BID element has to be inserted as a child of the SALE_ITEM that it corresponds to. Hence the TARGET is set to SALE_ITEM—where the SALE_ID is equal to the SALE_ID of the offer selected in the "Offers and Bids" window, which is passed to the "Create New Bid" window. NAME=BID specifies that a BID element is to be inserted. GUID=BID_ID specifies that the BID_ID is set to the generated unique ID. The remaining SRVPARMs are set to the data as input in the 'Create New Bid' window. The BID inserted under SALE_ITEM by this Service Function will look like this

```
<SALE_ITEM SALE_ID="S05" SELLER_ID="Mary" PROD=
"Lever arch"
PROD_ID="ID06" QTY="1" PRICE="11"
    CURRENCY="USD" SH_TRMS="FOB" PORT="North Pole"
    CTRY="SWE"
EXP_DATE="20001022" COMMENT="Beyond words.">
    <BID BID_ID="B13" BIDDER_ID="Steve" PROD="Lever arch"
PROD_ID="ID06" QTY="1" PRICE="6.30"
```

-continued

```
    CURRENCY="USD" SH_TRMS="FOB" PORT="South Pole"
    CTRY="FIN"
EXP_DATE="20001022"    COMMENT="Ring the bell when
delivering."/>
</SALE_ITEM>
```

Image Handling

The AltioLive Client downloads data images on demand. An example of this can be seen by looking at the catalog of products that is displayed when the "New Offer" button is clicked. When the "Create New Offer For Sale" window is displayed, the images for the first four items in the product list are downloaded. If you scroll down the list you will see a slight delay (usually about half a second) as new images are downloaded for the products in the lower part of the list. Notice that if you have scrolled through the list before, all of the images have already been downloaded, and thus the response is instant. This method of image handling results in improved performance, allowing applications to include rich image content without incurring a long initial download time. The code required to achieve this is given below.

```
<COL DATAFLD="THUMB" TYPE="IMG" W="40"
    IMGSVRCMD="GET_APPIMG"/>
```

Figure 13:
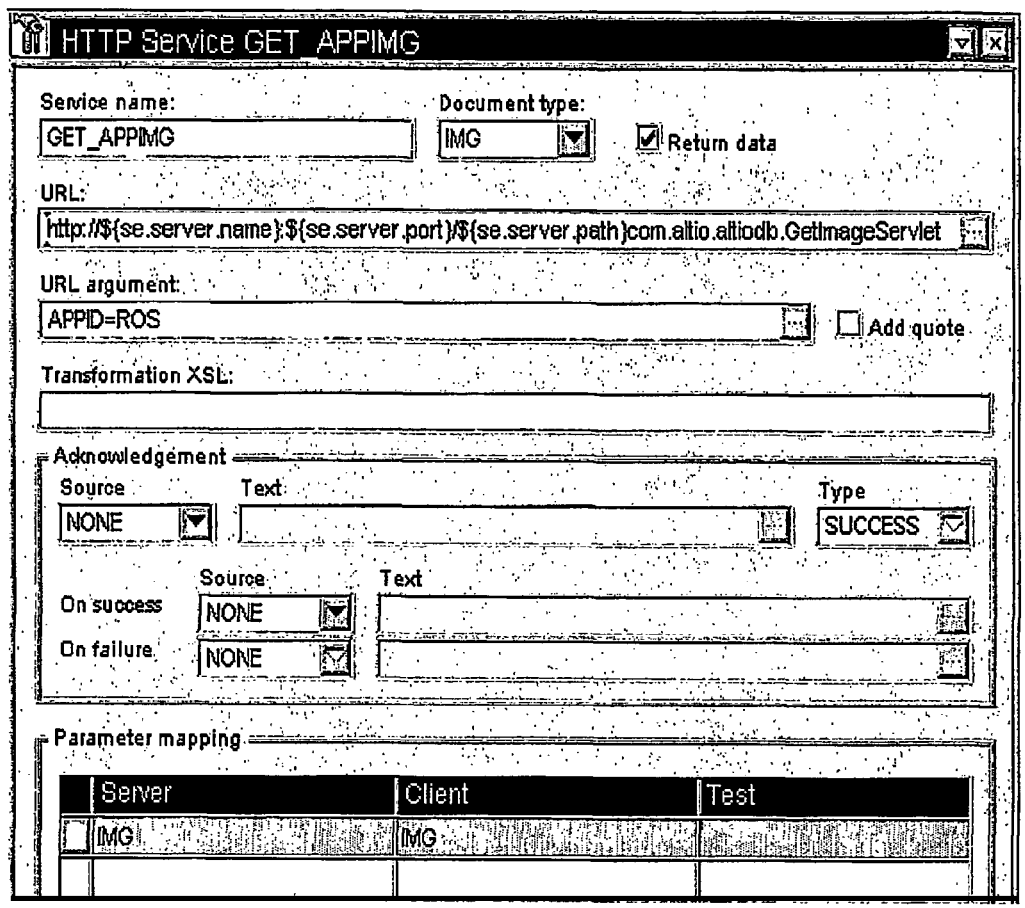
FIG. 13 is a representation of a "Select Produce" list, including a GET_APPIMG image server command.

This element specifies the column of the "Select a product" list, including a GET_APPIMG image server command—shown in FIG. 13. The image server functionality of the client handled when this Service Function is called, i.e. when the image is first displayed. The data for the list the column specifies is in //ITEM as its node. In the column a data field of //ITEM, THUMB is specified. This contains the directory path and name of the image e.g. THUMB="img/CalculatorT-N.jpg".

APPENDIX II

Integrating AltioLive from Altio Limited; Volume 4 Chapters 1-5 of the AltioLive User Documentation.

Introduction

Welcome

This document explains the system operation of AltioLive and how it is configured to integrate with existing applications. This covers various areas, from configuring controls to advanced issues of style, recommended practices and optimising performance.

Many examples in this document are drawn from the ROS (Richmond Office Supplies) example application. This allows you to see how to achieve particular results, and you can see working examples in the application.

The examples show the XML code of the application configuration and data, as explained in the API Guide. Each XML attribute maps directly on to the matching property of the control in the Designer. Each control corresponds to an XML element.

Readers should be familiar with the other Altio documents—in particular:

Getting Started

Online Help

Technical Overview
   Describes the overall operation of AltioLive and how the components of AltioLive integrate and operate to create a live dynamic interface.

Glossary
   Provides abbreviations and icons used throughout the document

Application Server Integration
   Configuration of the Sync Engine to support creation of Service Functions to integrate one or more applications with the Sync Engine. It covers:
   Initial Data
   Datapools
   Client to Application updates
   Image data
   Service Functions
   Communication options Data Sync
   Addresses the mechanisms used to update data (through Datapools) on the Client. It covers:
   Timestamps
   Datapool longevity
   Deleting data
   AL_IDs
   Client update Hosting the Client
   Invoking the Applet from the Host Web page. It covers:
   Standalone
   Debug mode
   Browser compatibility
   Dynamic mode
   Links to Javascript Logon Process
   Addresses the mechanism of logon process and session creation. It covers:
   Session Creation
   Altio Logon Process
   Independent Logon Skins
   Customization of the look of the Client through the use of Skins. It covers:
   The Outline Skin
   Showing the window is active
   Resizable windows
   Window controls buttons, toolbar buttons and icons
   Composite images Creating a Custom Jar
   Building a custom Jar to increase the download speed and efficiency.

Sync Engine Management

Covers
   The Sync Engine Admin Tool
   The Application Manager

Data Referencing and XPath
   Some examples of different methods of using XPath.

Configuring Controls
   Tips on using the Designer to configure controls.

Data Filtering
   Examines methods of selectively providing data.

Figure 14:
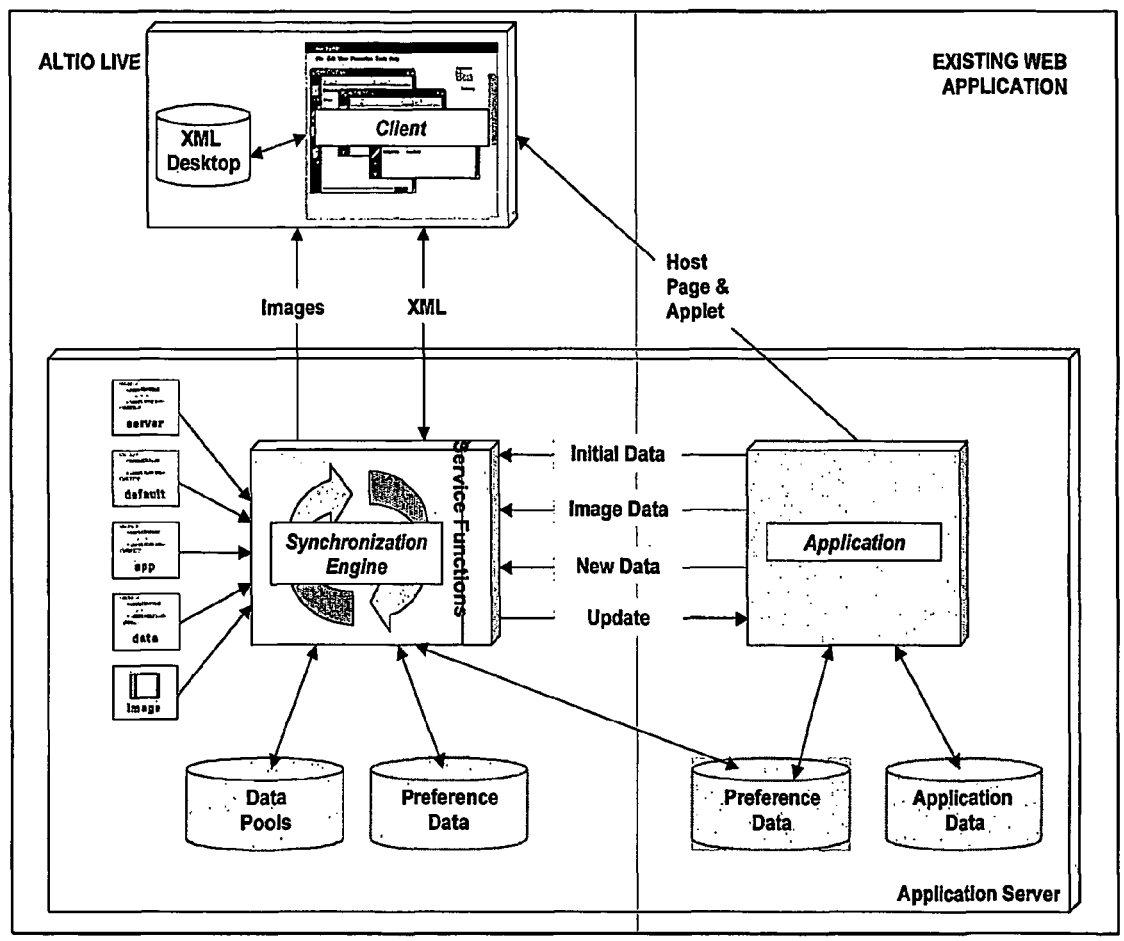
FIG. 14 is a schematic of the full system architecture of an AltioLive application.

More Information
   Further information on configuring AltioLive is contained in the online AltioLive API Guide and Operating and Maintaining AltioLive. Information on installing AltioLive is provided in the AltioLive Server Installation Guide. Support can be reached by sending email to support@altio.com.
   To send feedback to Altio on this manual, send email to: feedback@altio.com Chapter 1—Technical Overview
   The system architecture of an AltioLive application is shown in FIG. 14.

Where:
   The application interface is accessed through a Host Page, which invokes the AltioLive Client applet. The Client is a small footprint applet targeted at Java 1.1 Virtual Machines (IE4 and above, Netscape 4 and above) for maximum browser compatibility.
   The Client accesses the AltioLive Sync Engine. This is implemented as Java Servlets for use on Servlet engines, which support JSDK 2.0 to allow installation on common Application Servers.
   The look, feel and operation of the Application interface is defined through the Altio XML API (see AltioLive API guide). In establishing communication, the Client requests the Sync Engine to serve it with this definition which it creates from the Default XML (predefined by Altio), the Application Configuration XML and user preferences from any previous sessions.
   As part of its Application Configuration, the Client requests the Application Images (i.e. backgrounds, button images, icons and skins), which are served from the Sync Engine. These can be packed into one or more composite image files to minimize download times.
   The Sync Engine also processes the Data Configuration XML. This specifies Service Functions (defined in the Server Configuration XML) that request the Initial Data from the Application to be served to the Client where it is saved in the XML Desktop and rendered to the user.
   If there are images that are data related (e.g. thumbnails) rather than Application related, then the Image Data is requested from the Application when the Client specifically needs it using image specific Service Functions.
   The Data Configuration XML also subscribes the Client to Datapools within the Sync Engine. The Application updates the Initial Data by either polling for, or streaming, Data Updates from the Sync Engine. The mechanism and frequency is configured per Datapool in the Application Configuration.
   Datapools are shared across Clients and track changes from the Initial Data sent to the first Client. The status of a specific Client's XML Desktop in relation to subscribed Datapools and data on the Application is maintained through a timestamp/sequencing mechanism.
   New Data is either polled-from or streamed-to the Client asynchronously to maintain the XML desktop.
   Updates from the Client (i.e. data that has been entered by the user) are passed to the Sync Engine and posted to the Application through a Service Function that can be mapped on to its existing HTTP post interfaces. The effect of the update is reflected through the previously described Datapool mechanism and/or through user confirmation.
   If the user changes the state of their desktop (window positions, state) then these are posted to the Sync Engine. According to the Server Configuration, these are saved locally, saved in an external database through a JDBC connection or posted to the Application.

Sync Engines can be clustered/distributed to serve large communities of users using a Master-Slave configuration.

Chapter 2—Application Server Integration

Overview

FIG. 15 shows the interaction between the Sync Engine and the Application.

There are three key areas:
1. Data Service Functions that request the Initial Data and then pass updates to the Application
2. Image Service Functions that request Data-specific images
3. Datapools, which update the Initial Data Initial Data The Data Configuration defines the Initial Data set for the Client. This invokes one or more Service Functions to request data from the Application that is then served to the Client An example Data Configuration is shown below:

```
<ALTIO>
    <DATA>
        <USER NM="to_be_set_by_SyncEngine"/>
        <INCLUDE SVRCMD="GET_CATALOG"/>
        <INCLUDE SVRCMD="GET_FORSALE" SUBSCRIBE=
        "NEW_FORSALE"
            SUBSCRIBE_ARGS=""/>
    </DATA>
</ALTIO>
```

The INCLUDE elements can be considered as effectively substituting the XML data elements returned by the Service Function before the data is passed to the Client.

In the case of the GET_CATALOG Service Function, the catalog data it returns is static data (i.e. not updated during the user session) and therefore it does not subscribe to a Datapool. In the case of the GET_FORSALE data, this is 'live' data subscribed to the NEW_FORSALE Datapool. The name used in a SUBSCRIBE should correspond to a Datapool definition in the Application Configuration file.

The SUBSCRIBE_ARGS attribute can be used to apply filters to a Datapool i.e. to restrict which updates to the data set are passed onto the Client. In this case no filter is set so all Clients get all data updates. The value for SUBSCRIBE_ARGS can derive from session parameter values using the '{ }' syntax (see API Guide).

The USER NM attribute is optional and is a mechanism to make the User Id (from the session) accessible in the Client. An example is given in the Configuring Controls section.

Datapools

Datapools provide a method for distributing updates to multiple Clients. Each Datapool definition creates a single Datapool, which is instantiated when the first Client subscribes.

Datapools track changes to the Initial Data sent to the Client and received from the Application using timestamp information in the Datapool and in the Initial Data.

In a Master-Slave configuration, the Master Sync Engine receives the updates to the Datapools from the Application. The Slave Sync Engine communicates with the Master Sync Engine to receive the updates in its Datapools. The Client(s) polls for or is streamed to the updates in the Datapools of the Slave Sync Engine.

In a single Sync Engine configuration, the updates are received in the Datapools of the Sync Engine from the Application. The Client(s) either polls for or is streamed to the updates from the Datapools. An example Datapool definition from a Server Configuration is shown below:

```
<DATAPOOLS>
    <DATAPOOL NM='NEW_SALE' CACHESIZE='800'
        ARCHIVEFILENAME='C:\syncengine\Data\ArchiveNewNews.txt'>
        <MASTER DATAPATH='//FOR_SALE' SENDTIMESTAMP=
        'N'>
            <MASTERHTTP
POLLRATE='2000' URL="http://server.name/servlet/com.altio.demodb.DemoDB"
                URLARGS="ACTION=GET&PARENTTAG=
                FOR_SALE" />
            <TIMESTAMP ELEMENT='//FOR_SALE'
ATTRIBUTE='TIMESTAMP' TYPE='INTEGER' FORMAT='#'/>
        </MASTER>
        <SLAVE>
            <SLAVEHTTP POLLRATE="2000"/>
        </SLAVE>
    </DATAPOOL>
</DATAPOOLS>
```

This defines the NEW_FORSALE Datapool where:

| | |
|---|---|
| NM | Specifies the name of the Datapool. |
| CACHESIZE | Specifies the cache size of the Datapool. |
| ARCHIVEFILENAME | Specifies the relative pathname of the file where the old entries to the Datapool are archived.<br>For example, if Cache size is set to 800, the last 800 entries are held in the Datapool. All the earlier entries are archived to a file. |

Attributes for Master Sync Engine Communication with the Application

| | |
|---|---|
| DATAPATH | Specifies an XPath definition that specifies the subset of elements to extract from the application XML and then pass on as data updates. It defaults to the full XML returned by the application. |
| SENDTIMESTAMP | Specifies whether the Sync Engine should send the Timestamp with the update. |
| MASTERHTTP, MASTERHTTPSTREAM, MASTERSOCKET | Defines the communication option - in this case HTTP Polling. Note . . . The Communication is defined per Datapool. |
| URL | Defines URL of a function on the Application that is used to request updates. This attribute is specified if the communication protocol is set to HTTP Polling or Streaming. |
| URL ARGS | Specifies additional parameters passed in the HTTP Post Method - necessary if the Application function is non-specific (i.e. has multiple methods). This attribute is specified if the communication protocol is set to HTTP Polling or Streaming. |
| POLLRATE | Defines the poll rate interval for HTTP polling in milliseconds. This attribute is specified if the communication protocol is set to HTTP polling. |
| IP | Defines the IP address of the machine on which the back end Application is installed. This attribute is specified if the communication protocol is set to Socket. |
| PORT | Defines the port for the communication protocol is set to Socket. This attribute is specified if the communication protocol is set to Socket. |
| ELEMENT | Specifies the element within the returned data update that would contain the |

| | |
|---|---|
| | Timestamp. The element should be specified as an XPath query statement. |
| ATTRIBUTE | Specifies the attribute within the element specified that would contain the Timestamp value. |
| TYPE | Specifies the return type for the Timestamp. It can be set to INTEGER or DATE type. |
| Format | Specifies the Format in which the Timestamp is returned with the data update. |

Attributes for Slave Sync Engine Communication with the Client

| | |
|---|---|
| SLAVEHTTP, SLAVEHTTPSTREAM, SLAVESOCKET | Defines the communication option - in this case HTTP Polling. Note: The Communication is defined per Datapool. |
| POLLRATE | Defines the poll rate interval for HTTP polling in milliseconds. This attribute is specified if the communication protocol is set to HTTP polling. |
| PORT | Defines the port for the communication protocol is set to Socket. This attribute is specified if the communication protocol is set to Socket. |

In this case this is a polled definition, so an HTTP request is made every 2 seconds by the Master Sync Engine to the Application with the following parameters:

action=GetForSaleServlet&TIMESTAMP=nnnnn

Where TIMESTAMP is the last value for the Datapool (see next Chapter).

On receipt of an update, the Master Sync Engine adds the update to the queue of updates to be sent to the Slave Sync Engine. The Slave Sync Engine polls for the Update every 2 seconds. On receipt of an update, the Slave Sync Engine adds the update to the queue of updates to be sent to the Client(s).

Client to Application Updates

The Client updates the Application (i.e. to add/modify/delete data) by invoking a Service Function with parameters. This is defined in the View Configuration.

An example update request from a View Configuration is shown below:

```
<BUTTON H="30" W="70" X="90" Y="270" CAPTION="Submit" >
    <ACTIONRULES TRIGGER="CLICK">
        <ACTIONRULE DESC="Description of action rule">
            <CONDITIONS/>
            <ACTIONS>
                <ACTSERVER CMD="NEW_BID" WINDOWSTATE=
"HIDE"
DATATYPE="WINDOWDATA"/>
            </ACTIONS>
        </ACTIONRULE>
    </ACTIONRULES>
</BUTTON>
```

When the button captioned 'Submit' is pressed, the Client invokes the Service Function named NEW_BID and passes (as parameters) the name and value of all controls within the current window that have an NM attribute defined (i.e. they are named controls). There are two exceptions:

IMAGE—named-image passes blank values

LIST—lists use the named columns of the selected row. If no row is selected then a blank value is used for each named column. The list itself does not have to be named.

Service Functions return a success/fail status back to the Client with an optional message and optional parameter name which are treated as follows:

If successful and there is no message, then nothing is displayed to the user.

If successful and there is a message, then this is displayed in a 'success' pop-up window.

If unsuccessful and there is a message defined, then this is displayed in a 'failed' pop-up window.

If unsuccessful and there is no message, then nothing is displayed to the user.

If unsuccessful and there is a parameter control name, then the associated control is selected (i.e. cursor positioned on field in error).

Image Data

Data related images (e.g. thumbnails of catalog items) are requested from the Application (by the Client) through image request Service Functions. To avoid start-up delays, these images are only requested when they have to be rendered in the user interface, e.g. if a list contained images, only the visible images are requested. If the list is scrolled then more images will be requested. Images are cached on the Client once received and are not re-requested.

An example image request from an Application Configuration is shown below:

```
<PANEL>
    <IMAGE NM="IMAGE" DATAFLD="THUMB"
IMGSVRCMD="GET_APPIMG" H="80" W="80" X="260" Y="180"
DATA="//ITEM[@PROD_ID='{SALE_LIST@PROD_ID}']"
BORDERW="5"
FILLCOL="#FFFFFF"/>
    <TEXT H="20" W="100" X="120" Y="20" CAPTION="Product:"
    EDITABLE="N" DATAFLD="PROD"/>
    ...
</PANEL>
```

The DATAFLD specifies the attribute name in the element selected in DATA that holds the name of the required image. The IMGSVRCMD specifies the Service Function used to request the image (using the value of the attribute specified by the DATAFLD). In this case it will pass the value of the THUMB attribute in the specified element of DATA.

Service Functions

Service Functions define HTTP requests used to send and/or request data from the Application (for Initial Data and/or updates).

Whilst they are defined independently from the Application (thereby allowing multiple use of the Service Function) it's useful to consider some specific instances for:

Requesting Initial Data.

Requesting an update on the server.

Requesting an image.

They are designed to provide simple integration with the Application and (in the case of updates) to map onto existing HTTP post requests.

To have an acknowledgement message sent to the client after calling a service function, use the following steps:

1. In the Application Manager, edit the Service function.

2. Under Acknowledgement, set the Source to Response.

3. Click OK to accept, then validate and update the ApplicationConfig.xml file.

Requesting Initial Data

An example Initial Data request (GET_CATALOG) Service Function from a Application Configuration is shown below:

```
<SERVICE NM="GET_CATALOG"
URL="http://server.name/servlet/com.altio.demodb.DemoDB"
URLARGS="ACTION=GET&PARENTTAG=CATALOG"
ADDQ="N"
DOCTYPE="XML" GETDATA="Y"/>
<SERVICE>
```

Where:

| | |
|---|---|
| URL | Defines URL of the Application function that will be invoked by the Service Function. |
| URL_ARGS | Defines the additional parameters - necessary in this case, as the Application function is general purpose. |
| DOCTYPE | Specifies the type if data that is expected - in this case XML data. |
| GETDATA | Specifies whether the data returned by the Application should be served to the Client - in this case it is |

The Application in responding to this Service Function should supply XML formatted data. If the Datapool mechanism is to be used (i.e. to feed dynamic updates to the client) then the first tag must include a TIMESTAMP attribute e.g.:

```
<CATALOG TIMESTAMP="12890">
    <ITEM PROD="Calculator" PROD_ID="ID01" PRICE="4.49"
    DESCR="The best calculator around" />
    <ITEM PROD="Chair" PROD_ID="ID02" PRICE="69.50"
    DESCR="Comfortable and relaxing..." />
    ...
</CATALOG>
```

Refer to next Chapter for use of timestamps.

Requesting Updates to the Application

An example data update request (NEW_BID) Service Function from an Application Configuration is shown below:

```
<SERVICE NM="NEW_BID"
URL="http://server.name/servlet/com.altio.demodb.DemoDB"
URLARGS="ACTION=NEW&PARENTTAG=SALE_ITEM&PARENTI
D=SALE_ID&NAME=BID&GUID=BID_ID" ADDQ="Y"
DOCTYPE="XML" GETDATA="N" ACKSRC="HEADER"
ACKTYPE="SUCCESS" ACK="Added record">
    <ONSUCCESS MSGSRC="DEFINE" MSG="Your bid has been
    accepted"/>
    <ONFAILURE MSGSRC="DEFINE" MSG="There was a problem
processing your request"/>
    <SRVPARM SERVER="SALE_ID" CLIENT="SALE_ID"/>
    <SRVPARM SERVER="BIDDER_ID" CLIENT="{logon.name}"/>
    <SRVPARM SERVER="QTY" CLIENT="QTY"/>
    <SRVPARM SERVER="PRICE" CLIENT="PRICE"/>
    ...
</SERVICE>
```

Where:

| | |
|---|---|
| DOCTYPE | Specifies the type of data that is expected - in this case general text (i.e. not XML or an image). |
| GETDATA | In this case specifies that it should not be returned to the Client. Note: It should not be set to "Y" if the DOCTYPE is not "XML". |
| ADDQ | Defines whether single quotes should be put around the parameter values passed with the request. |
| ACKSRC | Defines the source of response message. Set it to RESPONSE to search for a response message defined in the Application. Set it to HEADER to search for Altio specific parameters (see below) in the HTTP response header. Set it to NONE if no message is required. |
| ACKTYPE | Defines whether the Sync Engine should search for the response message after the Success or Failure of the Service Function. |
| ACK | Defines the Application defined response message that the Sync Engine searches for if the ACKSRC is set to RESPONSE. |
| ONSUCCESS MSGSRC | The Sync Engine can be set to serve the Client a message in a pop-up window, if the result of the Service Function was successful. Defines the source of message. Set it to DEFINE to send a user defined message. Set it to HEADER to return the Altio specific parameters (see below altio.message) in the HTTP response header. Set it to NONE if message is not required. |
| ONSUCCESS MSG | Defines a confirmation message. The Sync Engine serves the message to the Client in a pop-up window on the success of the Service Function. The Text can be set only if Source is set to DEFINE. |
| ONFAILURE MSGSRC | The Sync Engine can be set to serve the Client a message in a pop-up window, if the result of the Service Function was a failure. Defines the source of message. Set it to DEFINE to send a user defined text. Set it to HEADER to return the Altio specific parameters (see below altio.message) in the return HTTP header. Set it to NONE if no message is required. |
| ONFAILURE MSG | Defines a message. The Sync Engine serves the message to the Client in a pop-up window on the failure of the Service Function. The Text can be set only if Source is set to DEFINE. |
| SRVPARAM | Defines the parameters that are passed (and their order) with the request. This also maps Client defined parameter names (which are derived from control names) to Application parameter names. |

In this case, his would result in an HTTP request with the following parameters:
action=NewBid&SALE_ID='...'&BIDDER_ID='...'&QTY='...'&PRICE='...'

Note: The second parameter is a special case. CLIENT="[UID]" is used to define that the User ID defined in the session parameters is passed as the value for BIDDER_ID. If other parameters from the session are to be used, then the { } syntax can be used to specify session parameter e.g. {logon.name} would have the same effect as [UID].

The above method is good for integrating on a preexisting Application Interface and provides mechanisms for confirming the success/failure of the update.

If the Application Interface can be modified, then the Application can set Altio specific parameters in the HTTP response header as follows:

| | |
|---|---|
| altio.status | Set to:<br>0 indicates Success<br>1 indicates failure (no message)<br>2 indicates failure (with message). |
| altio.message | If status = 2, then this contains descriptive text that will be displayed to the user in the pop-up error window. |
| altio.errfld | Contains the server parameter name that caused the error. This is converted back into the Client control name and passed back to the Client so it can re-position back on the field. |

Requesting Images

An example image request (GET_APPIMG) Service Function from an Application Configuration is shown below:

```
<SERVICES>
    <SERVICE             NM="GET_APPIMG"
URL="http://server.name/servlet/com.altio.demodb.GetImageServlet"
ADDQ="N" DOCTYPE="IMG" GETDATA="Y">
        <SVRPARM SERVER="APP" CLIENT="{logon.app}"/>
        <SVRPARM SERVER="IMG" CLIENT="IMG"/>
    </SERVICE>
    ...
</SERVICES>
```

Where:

| | |
|---|---|
| URL | Defines URL of the Application function that will return the image. |
| DOCTYPE | Specifies the type if data that is returned - in this case an Image (i.e. JPEG, GIF etc). |
| GETDATA | Specifies that the data requested by the Service Function will be returned to the Client. |
| SVRPARAM | Specifies the mapping between parameters passed by the Client in the service request to the Sync Engine into parameters passed by the Sync Engine to Application. Note: This must use CLIENT = "IMG". |

In this case, this would result in an HTTP request being made with the following parameters:
IMAGEURL=imageurlname Downloading Data on Demand Normally all data (apart from context-dependent images) is downloaded onto the client at the same time as the applet. However, there are some circumstances where you may want to have data downloading, only if (or when) it is required by the user.

If you have an action rule set up on a list so that when a user double-clicks on a row they get a list of related information in a separate window. If the related information is very large then it may be efficient to download it on demand so that time is not used downloading information that may not be required by the user.

1. Downloading Sets of Data on Demand.

This can be achieved by taking the datapool subscription for the data out of the viewname_data.xml file and implementing it as an ACTSERVER action rule, triggered by a particular event.

Example:

Rearrange the ROS demo data into a file of the sale items and a file of the bids and alter the service functions so that sale items are initially sent to the client and the relevant bids are only sent when a particular sale item is selected.

The action rule is placed on the list of sale items and looks like:
   Trigger=ONCHANGE
   Action=ACTSERVER
      Command=GET_BIDS
      Data type=STRING
      Data='{SALE_LIST@PROD_ID}'
      Data tag=PROD_ID
      Window state=RESUME where Data tag and Data roughly correspond with attribute and value.

The GET_BIDS service function has an XPath target statement requesting bids with a particular PROD_ID.

2. Updates for the Downloaded Data Set—Data Routing

We can also assign a datapool to update this data. If we set the datapool as non-transient:

```
<DATAPOOL NM='SECURITIES_POOL'
FILTER =
'/SECURITIES/SECURITY[/USERS/USER[@USER_ID=
${session.logon.name}]/USERSYMBOL/@NM=@SYMBOL]'
...
</DATAPOOL>
```

By calling a service function through an ACTSERVER action rule we cannot subscribe to a datapool so we cannot get updates. Luckily this is changing in the next software release where we have introduced the idea of non-transient datapools. We can create an entry in a second datapool that acts like a temporary subscription to the main datapool containing all the updating data. Hence we can temporarily request updates for a particular set of data when we open a window and automatically cancel the updates when the window is closed.

Communication Options

The mechanism used for Service Functions is always the HTTP POST Method. This Sync Engine will accept GZIP and ZIP compression formats in response to these requests to minimize traffic volumes from the Application.

Three mechanisms are available to provide New Data to the Datapools:
   HTTP Polling—wherein the Sync Engine periodically polls the Application for updates.
   HTTP Streaming—wherein the Sync Engine opens an HTTP Request and the Application sends updates as they occur.
   Socket—as per streaming but using the underlying socket mechanism.
   The mechanism is specified per Datapool.

Of these three mechanisms, the first is normally the easiest to implement against an existing Application (as it requires least change to the Application architecture). The latter two are mechanisms for rapidly changing data Note: None of these three mechanisms accept compressed data format (they should only be handling small data sets)

If the SOCKET mechanism is used then the Sync Engine will automatically add an additional parameter in the HTTP request SOCKET="nn" to specify the socket address for the Application to use in responding with data.

Data Formats

Date and time data is expected in AltioLive in the format YYYYMMDDTHHMMSS +x

Where the Time part (THHMMSS +x) is optional, and the GMT offset of the server (+x) is also optional.

Other Notes
1. The Sync Engine does not check that the returned data matches the DOCTYPE.
2. The Sync Engine will output a warning if the parameters provided by the client do not match those defined in the Service Function.
3. URL_ARGS if specified are posted before SVRPARAM values.
4. When using HTTP Polling, the first poll occurs immediately.
5. The Sync Engine is inactive until the first user connects.

Whilst one Service Function can be used for Initial Data it is often better to define a number of Service Functions if:

There are multiple Datapools in use

Data is separately time stamped

Service Functions are shared across a number of Application Configurations which define an interface which uses different data sets Data is sourced from multiple Applications.

Its better to have small Datapools for specific data rather than an all-embracing large Datapool. This allows more control over refresh rates and avoids conflicts over XML attribute names.

Its better to filter data on the Sync Engine than on the Client.

Chapter 3—Data Sync

Overview

The Datapool mechanism is used to update multiple Clients from a single update from the Application—wherein only the XML element that has changed is sent to the Client.

Timestamps

Each Datapool has an associated Timestamp. This is in the form of a long integer value or in Date/Time format.

The Timestamp is initially set when the first Client subscribes to the Datapool and receives its Initial Data (in which there must be a TIMESTAMP=nn attribute in the initial tag).

Thereafter, the Timestamp is updated whenever, the Sync Engine receives updated data from the Application whether by polling (in which case it passes its current value in the request) or through streaming. The new Timestamp is specified as an attribute in the initial tag of the response.

The interpretation of the Timestamp is determined by the Application and is specific to each Datapool (i.e. AltioLive does not specify whether the number is milliseconds, seconds, next sequence number etc). However, the Timestamp must get numerically larger with each update.

The Timestamp is sent an integer or date/time format. It should support the expected lifetime of an Application. In the unlikely event that the Timestamp has to be reset, then the Sync Engines would need to be reset.

A Timestamp parameter accompanies the Data Update request sent by the Sync Engine to the Application. In some cases, while integrating an existing Application with AltioLive, it would be necessary to exclude the Timestamp parameter from the Data Update request.

By default, the Application returns the Timestamp value as an attribute of the parent node of the data update posted by the Application. However, the Timestamp can be retrieved from a specified element attribute from the data update received from the Application in a specified format.

If for any reason, an update is received with a duplicate of an earlier Timestamp then the Sync Engine will output a warning message.

Datapool Longevity

The Datapool effectively has an entry per timestamp. The size of the Datapool is determined through the CACHESIZE attribute. By default this is set to 800 entries, which means that the last 800 updates are held in the Datapool.

The required size of the Datapool depends on the frequency of update to Clients and the frequency of update from the Application. If the Client were to poll at 3-second intervals and the Application creates updates at a rate of 2 per second, then it should be set to at least four times the rate (i.e. 4*3*2=24) to provide contingency.

The last number of updates equal to the quarter of the cache size per Datapool are cached in memory. Earlier updates are archived to disk. For more details see the Datapool topic in the API guide.

Deleting Data

To update an XML element or insert a new XML element in the XML Desktop, the Application simply has to supply the element through the Datapool mechanism.

However, to delete an element, the AL_ACTION=DELETE attribute must be added to the element (specifying sufficient attributes to uniquely identify the element)

For example, the following XML updates the description of the chair and deletes the calculator:

```
<CATALOG TIMESTAMP="12891">
    <ITEM PROD="Calculator" PROD_ID="ID01" PRICE="4.49"
    AL_ACTION="DELETE"
        DESCR="The best calculator around" />
    <ITEM PROD="Chair" PROD_ID="ID02" PRICE="69.50"
        DESCR="Comfortable and relaxing and now in brown suede" />
</CATALOG>
```

AL_IDs

Data elements that are updated in the XML Desktop need to be uniquely referenced and AltioLive uses an AL_ID attribute to define a unique key for each element The Sync Engine through the DATAKEYS definition adds these AL_IDs.

An example Datakeys definition from a Server Configuration follows:

```
<DATAKEYS>
    <DATAKEY NM="ITEM" PREFIX="CAT">
        <FIELD NM="PROD_ID"/>
    </DATAKEY>
    <DATAKEY NM="SALE_ITEM" PREFIX="SALE">
        <FIELD NM="SALE_ID"/>
    </DATAKEY>
    <DATAKEY NM="BID" PREFIX="BID">
        <FIELD NM="BID_ID"/>
    </DATAKEY>
</DATAKEYS>
```

Where:

DATAKEY NM

Specifies the name of an XML element tag—in this case <ITEM . . . />

FIELD NM

Specifies the attribute name within the element whose value is used as the key—therefore this attribute should have unique values within all elements of the same type.

PREFIX

Specifies a prefix that is added to differentiate between different types of element that might otherwise have non-unique values.

The result of the first DATAKEY definition on the following data would be as follows:

```
<CATALOG>
    <ITEM PROD="Calculator" PROD_ID="ID01" PRICE="4.49"
        DESCR="The best calculator around" />
    <ITEM PROD="Chair" PROD_ID="ID02" PRICE="69.50"
        DESCR="Comfortable and relaxing..." />
</CATALOG>
``` becomes:

```
<CATALOG>
    <ITEM AL_ID="CAT_ID01" PROD="Calculator" PROD_ID=
    "ID01"
PRICE="4.49"
        DESCR="The best calculator around" />
    <ITEM AL_ID="CAT_ID02" PROD="Chair" PROD_ID=
    "ID02"
PRICE="69.50"
        DESCR="Comfortable and relaxing..." />
</CATALOG>
```

Client Update

Datapool updates are either polled from the Sync Engine by the Client or streamed to the Client.

In the case of Polling: the Client polls the Sync Engine using its current Timestamp(s) (either the Initial Data or last successful poll). In response to the poll, the Sync Engine will send all updates (for all Datapools subscribed by the Client) subsequent to the Timestamp.

In the case of Streaming, the Sync Engine maintains a queue of Clients that are subscribed for streamed updates. As the Datapool is updated, the relevant updates are added to a queue for each Client.

Other Notes
1. The Client Queue is fixed length (16 entries). In the event of a queue being full (only likely if the Application generates updates at a high rate and/or the Client is subscribed to many Datapools), Datapool updating will suspend for up to 30 seconds to allow the queue to clear. If the queue is still full after 30 seconds, the Client session is terminated.
2. In the event of the Client Queue being full/disconnected, warning messages are output to the Sync Engine log.

Chapter 4—Hosting the Client

Overview

The AltioLive Client applet is hosted in a host HTML page specific to each customer Application and may occupy the whole page or share the page with HTML defined areas (usually frames) around the applet space.

Debug Mode

If the application is to be run in debug mode, the debug version of the applet needs to be specified, and the types of debug message given can be configured.

```
<HTML>
    <HEAD>
        <TITLE>Demo</TITLE>
    </HEAD>
    <BODY topmargin="0" leftmargin="0" marginwidth="0"
```

```
marginheight="0">
        <applet code="com/altio/AltioApp.class"
            align="baseline" width="800" height="600"
            archive="lib/clientDebugServer.jar">
            <param name="CONFIGFILE" value="Demo.xml">
            <param name="STANDALN" value="Y">
            <param name="DEBUG" value="SYSTEM APPLET
CONFIG PAINT !PAINTTRACE !ACTIONRULE !SERVERIO
!TRACKING !PARSING !XPATH UNASSIGNED" />
        </applet>
    </BODY>
</HTML>
```

The values: SYSTEM APPLET CONFIG PAINT !PAINTTRACE !ACTIONRULE !SERVERIO !TRACKING !PARSING !XPATH UNASSIGNED, are the available types of error messages. Those prefixed with an exclamation mark are turned off.

where:

| | |
|---|---|
| archive | Specifies the applet file name. |
| Code | Specifies the main class for the client applet and must be set to com/altio/AltioApp.class. |
| align, width, height | Define the location and fixed size of the AltioLive Desktop area within the page. The size of the Altio desktop can be set relative to the size of the browser window using the % setting e.g. "width = "100%" height = "99%" |
| Param | Parameter values that define the name of the XML Application Configuration (Note: there should be an equivalent Data Configuration file in this case named demoStandaln_data.xml) and that the applet is operating in standalone mode. |

Browser Compatibility

The above invocation works for most browsers. There is currently one known exception for Netscape 4.x running on the Macintosh. It only supports Java effectively with the MRJ plug-in installed. Also the Embed tag must be used instead of the Applet tag with additional parameters. See htmltemplate.txt for an example of how to detect and support this.

When using AltioLive in Dynamic mode it is necessary to change the HTML to reflect the connection to the Sync Engine.

Figure 16:
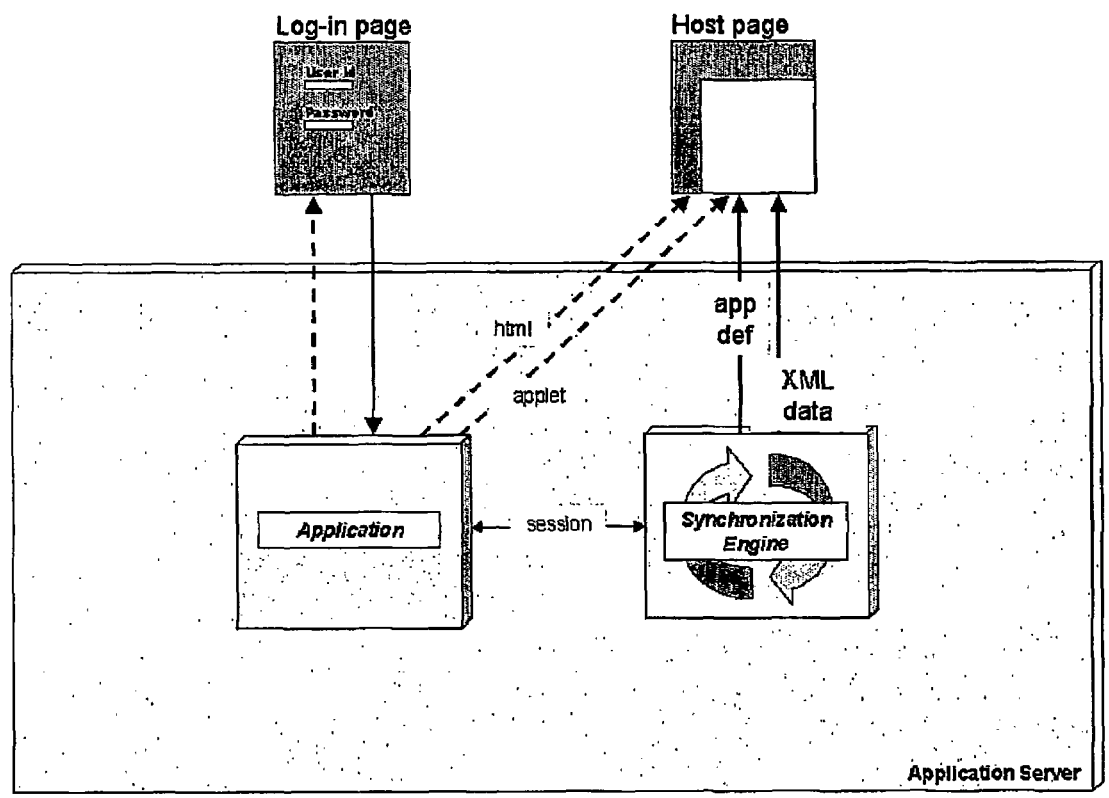
FIG. 16 is a schematic of AltioLive in Dynamic Mode. In Dynamic mode it is necessary to change the HTML to reflect the connection to the Synchronization Engine.

FIG. 16 shows a typical example of this integration.

The user logs on to the Application through its Logon process. For the demos provided with AltioLive, an Altio Login page is provided. (This is purely for demonstration purposes and is not intended for use in final applications.) Either directly (from the Logon page) or indirectly (through other pages/menus) the user invokes the URL of the Host page. The Application then constructs and serves the Host page HTML that invokes the Client with necessary parameters. (See Chapter 6 Logon Process for further details.)

Once downloaded, the Client establishes communication with the Sync Engine to access the Application definition (personalized for that user) and the data required. This requires the Sync Engine to access the user's session which it should inherently have access to either through co-location on the application server or through session propagation in a clustered application server environment.

An example of the applet invocation HTML would be:

```
<applet code="com/altio/AltioApp.class"
    align="baseline" width="800" height="600"
    archive="clientDebugServer.jar">
    <param name="appsrc" value="......altioserver URL">
    <param cookie="cookie string">
</applet>
``` where the major differences are:

| | |
|---|---|
| Appsrc | Specifies the URL of the Sync Engine instead of a local file. |
| Cookie | Specifies cookie string (necessary for some Macintosh deployments because cookie information is not always inherently accessible to Java applets). This should not be used for LINUX client deployments. |

Debugging the Client—During system integration it is possible to enable debug output by the Client to the Java Console. Contact Altio Technical support for details.

Javascript—Action Rules within the Application Configuration can invoke Javascript e.g.:

```
<BUTTON H="30" W="80" X="200" Y="15" CAPTION=
"ALTIO.COM">
    <ACTIONRULES TRIGGER = "CLICK">
        <ACTIONRULE DESC="Default Action">
            <CONDITIONS>
            ...
            </CONDITIONS>
            <ACTIONS>
                <ACTJAVASCRIPT METHODNAME="MYMETHOD"
                    ARGS="BTNCLICK">
            </ACTIONS>
        </ACTIONRULE>
    </ACTIONRULES>
</BUTTON>
a final
```

Or can invoke a Javascript function e.g.:

```
<BUTTON H="30" W="80" X="200" Y="15" CAPTION=
"CALCULATOR">
    <ACTIONRULES TRIGGER = "CLICK">
        <ACTIONRULE DESC="Default Action">
            <CONDITIONS>
            ...
            </CONDITIONS>
            <ACTIONS>
                <ACTION_APP CMD="JAVASCRIPT"
                SCRIPT="calculator( )" />
            </ACTIONS>
        </ACTIONRULE>
    </ACTIONRULES>
</BUTTON>
```

The actual Javascript method will be invoked asynchronously in a separate thread (in order to keep the applet responding). The Javascript action rule returns immediately and the actions continue with the next action if there is one. For this action rule to work a MAYSCRIPT tag is needed on the APPLET tag in the HTML page hosting the applet.

E.g. <applet code="com.altio.AltioApp" align="baseline" width="1041" height="702" viewastext archive="runthis.jar" mayscript>

Note: Currently there is no mechanism in place to make use of the value returned by the Javascript method, so the Javascript call should be seen as a one-way call (which is suitable for most cases).

Other Notes

1. The Application Server environment manages the session 'life'. If a session expires and the Client is still active the user can be redirected to an HTML page (e.g. a Logon page) configured in the Server Configuration file.

2. The Sync Engine can be configured to issue probe messages to the Client that let the Client know the Sync Engine is still 'live'.

3. Parameters can be passed to Javascript.

4. Use of Javascript may add additional compatibility issues.

Chapter 5—Logon Process

Session Creation

The Sync Engine requires access to the session on the Application server. Hence a session must be created before invoking the applet from the Host Page. The user logs on to the Application through its Logon process. This establishes a shared session on the Application server.

The Default Altio Login Process

Figure 17:
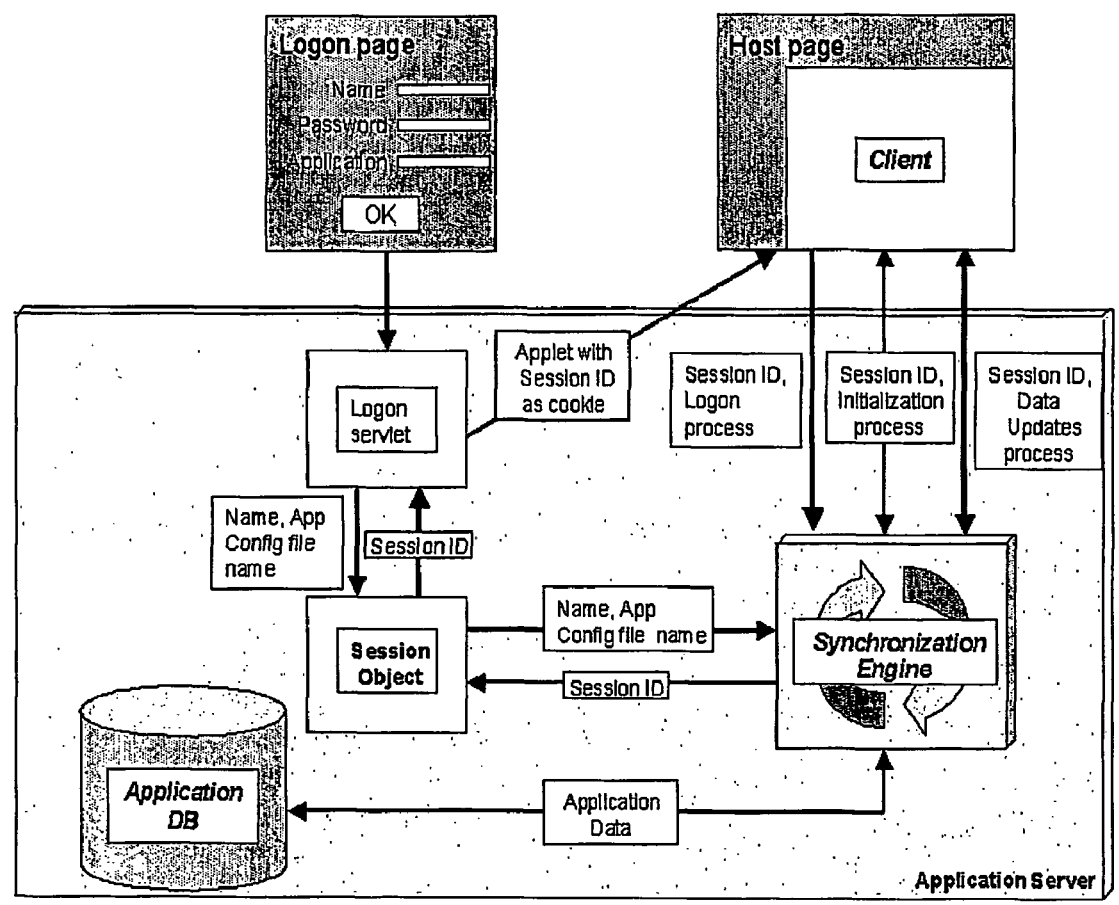
FIG. 17 is a schematic of the Logon process used by the AltioLive Demonstration applications.

The Logon process used by the Altio Demonstration applications is described below and is also shown in FIG. 17. The subsequent section gives examples and recommendations to help you code your own Logon mechanism. The Altio Logon HTML page creates a session by communicating to a Java servlet, which takes the parameters of user Name, Password, and the Application name as entered. Password and Application name are verified against the AltioLiveDemo.xml file. Once the correct parameters have been entered, a user session is created by the servlet so that user-specific data is displayed and the correct user preferences are used. There is also the option of loading different XML configuration files, which could depend on what is entered in the Application field as in the example, or some other parameters such as user type.

The Altio Logon process is implemented as described below.

1. The user loads the logon HTML page in the browser, by typing the URL or following a link.
2. The Logon page prompts the user to input user Name, Password and Application name.
3. When user clicks 'OK', a communication link to the Logon Servlet is established.
4. The Logon Servlet verifies the user Name, Password and Application name.
5. If the logon information is correct, the Logon Servlet creates a Session Object with a unique Session ID. The Session ID is stored on the Application server with the session lifetime. The Logon Servlet also stores the parameters, AL_logon.name and AL_logon.config in the Session Object
6. The name of the Client applet along with the Session ID (as a cookie) is passed to a Host HTML, page.
7. The Host HTML page then invokes the Client. It sends the Session ID and the Logon request to the Sync Engine.
8. The Sync Engine restores the Session Object with the Session ID. It retrieves the user Name and Application configuration file name from the Session Object As a part of the Logon request, the user is then subscribed to the appropriate Datapools.

9. The Client now sends an initialisation request to the Sync Engine accompanied by the Session ID.
10. The Sync Engine requests Initial Data from the Application database.
11. The Sync Engine reads the Application configuration from the Application configuration file.
12. The Application configuration along with user preferences and the Initial Data is sent to the Client in response to the initialization request
13. After the initialization process, the Client sends the first Data Update request to the Sync Engine. The Data Updates are either streamed to or polled from the Client. If the streaming mechanism is used, the streaming connection is opened in response to the first Data Update request and new data, if available, is sent to the Client. If the polling mechanism is used, the first poll occurs after the logon and new data, if available, is sent to the Client.

In the above process, the propagation of the Session ID at each stage is essential, since the Sync Engine can restore the session if it has received the Session ID.

Independent Logon

In your application you may have an existing Logon process or you may wish to write one. This logon mechanism must also create the session. You don't need the AltioLive-Demo servlet and XML files once you log on through your own Logon handler. The Host page needs to be modified accordingly. If you would like an example HTML logon page and the Java servlet that it calls, please contact Altio Technical Support. If no Logon process is required, then you can directly type the URL of the HTML page that calls a Java servlet. This servlet must perform the following tasks.

Creating a session with appropriate parameters
Passing the Client applet name along with the Session ID as the cookie to the Host HTML page When a session is created, the following tags need to be included:
logon.name—holds the user name
logon.conf—holds the name of the view configuration XML (client)
logon.app—holds the APPID as defined in the Sync Engine Admin tool.
Further tags specific to your application may also be included.

This means that anyone with an internet connection could conceivably use your application. It also means you won't be able to track which users are using the application.

A Technical Note detailing the No login Handler is available from Altio Tech Support.

The invention claimed is:

1. A presentation server, being computer software stored on a computer readable storage medium and running on a presentation server computer, in which the presentation server computer acts as an intermediary between (a) multiple, separate data sources which are each physically remote from the presentation server computer and between (b) multiple client devices, which are also each physically remote from the presentation server computer and connected to the presentation server computer over one or more networks, each of the client devices running a network based application that runs over the network connecting the presentation server computer to each of the client devices; and each of the client devices also receiving structured data from at least one of the data sources;

in which the presentation server decouples the client devices from the multiple, separate data sources by insulating the data sources from needing to handle directly any display, data storage, data querying or communications functions relating to the client devices and insulating the client devices from needing to handle communications functions which are specific to the data sources; and in which the presentation server also automatically pushes updated data from the multiple, separate data sources to the network based application running on each of the client devices that displays the updated data by aggregating the updated data from the data sources into a single data stream for each of said client devices.

2. The presentation server of claim 1 which enables at least one of the data sources to indirectly configure any display, data storage, data querying or communications functions relating to each of the client devices and enables each of the client devices to indirectly communicate with the data source.

3. The presentation server of claim 1 in which communication to at least one of the data sources is carried out over a network and in which interaction can occur via services provided by at least one of the data sources.

4. The presentation server of claim 1 in which communication to at least one of the data sources is carried out over a network and in which interaction can occur via message queues to which at least one of the data sources publishes and the presentation server subscribes.

5. The presentation server of claim 1 in which communication to at least one of the data sources is carried out over a network and in which interaction can occur via message queues to which the presentation server publishes and at least one of the data source subscribes.

6. The presentation server of claim 1 in which communication to at least one of the data sources is carried out over a network and in which interaction occurs via direct calls to at least one of the data source's application programmable interface (API) where the underlying system provides the low-level protocol.

7. The presentation server of claim 1 in which communication to a data source is carried out over a network and in which interaction occurs via direct calls to one or more databases on at least one of the data sources.

8. The presentation server of claim 1 in which communication to at least one of the data sources is carried out over a network and in which interaction with at least one of the data sources is loosely coupled.

9. The presentation server of claim 1 which insulates at least one of the data sources from needing to handle directly any display, data storage, data querying or communications functions relating to each of the client devices by communicating with client software on each of the client devices which comprises:

(a) a communications layer to send and receive messages over the network;
(b) a database layer to store, and allow querying of, the structured data;
(c) a rendering layer which generates, from the structured data in the database layer, data for a user interface;

in which the client software is self-contained to provide all of the communications, local data storage/querying and rendering resources needed to run the network based application on each of the client devices.

10. The presentation server of claim 1 which also allows at least one of the data sources to handle indirectly any display, data storage, data querying or communications functions relating to each of the client devices by forwarding communications from at least one of the data sources to client software on each of the client devices.

11. The presentation server of claim 1 which by virtue of strictly separating at least one of the data sources from each of the client devices allows business logic of an application to be fully independent of the presentation logic on each of the client devices such that at least one of the data sources need not even know of the existence of each of the client devices even though they may be a necessary part of the network application.

12. The presentation server of claim 1 which by virtue of strictly separating at least one of the data sources from each of the client devices allows presentation logic of each of the client devices to be fully independent of the business logic on at least one of the data sources even to the extent that each of the client devices need not even know of the existence of at least one of the data sources even though at least one of the data sources is a necessary part of the network application.

13. The presentation server of claim 1 which insulates each of the client devices from needing to directly handle communications functions which are specific to at least one of the data sources by translating messages from each of the client devices to a form suitable for at least one of the data sources.

14. The presentation server of claim 1 which insulates each of the client devices from needing to directly interpret raw data provided by at least one of the data sources by translating messages from at least one of the data sources to a form suitable for each of the client devices.

15. The presentation server of claim 1 which insulates at least one of the data sources from needing to directly manage updates of the structured data held on each of the client devices by receiving a single data update from at least one of the data sources and being solely responsible for identifying each of the client devices that need that data update, and sending the appropriate updating data to each of the client devices that need that data update.

16. The presentation server of claim 1 which insulates each of the client devices from needing to know the quantity or configuration of multiple data sources to which the presentation server is connected, by aggregating data from multiple data sources into a single data stream for each of the client devices.

17. The presentation server of claim 1 which maintains a data stream per each of the client devices in which the data is pushed over a persistent connection to each of the client devices over the network as soon as that data is available.

18. The presentation server of claim 1 which maintains a data stream per each of the client devices in which the data is sent to each of the client devices over the network in response to regular or ad-hoc polling requests from each of the client devices.

19. The presentation server of claim 1 which compresses the data received from the data source prior to sending the information to each of the client devices.

20. The presentation server of claim 1 which encrypts the data received from at least one of the data sources prior to sending the information to each of the client devices, thus insulating at least one of the data sources from the enhanced security needed to allow a remote client device to run the network application over a public or insecure network.

21. The presentation server of claim 1 which decrypts the data received from each of the client devices prior to sending the information to at least one of the data sources, thus insulating at least one of the data sources from the enhanced security needed to allow a remote client device to run the network application over a public or insecure network.

22. The presentation server of claim 1 which insulates at least one of the data sources from needing to manage updates of the structured data held on each of the client devices e by regularly polling at least one of the data sources for changes.

23. The presentation server of claim 1 which insulates at least one of the data sources from needing to directly manage distribution of streaming data to multiple client devices, where at least one of the data sources needs only to provide a single stream to a presentation server which in turn broadcasts the information in a scalable fashion to multiple (potentially more than tens of thousands) of client devices that may in turn be connected to the presentation server at different performance rates over the network.

24. The presentation server of claim 1 which insulates at least one of the data sources from needing to handle communications functions specific to different client devices by having a generic communications capability (data receipt/acknowledgement/response) enabling the presentation server to communicate with multiple client browsers, multiple client device types and across multiple bearers.

25. The presentation server of claim 1 which insulates at least one of the data sources from needing to handle communications functions specific to different client devices by having a generic display capability by being able to download to the database layer one or more of the following, each configured appropriately for a destination display, device type and bearer: panels, windows, controls, data binding to the controls and event models.

26. The presentation server of claim 1 which can process a request by each of the client devices for an update to at least one of the data sources and return an indication of whether the update was successful as indicated by a response from at least one of the data sources.

27. The presentation server of claim 26 in which, if the update failed, at least one of the data sources optionally provide further information about the reasons for the failure in a way that can be displayed or interpreted by each of the client devices.

28. The presentation server of claim 1 which can process a request by each of the client devices for an update to at least one of the data sources and return an indication of whether the update was successful even if at least one of the data sources does not directly respond with a success or failure indication.

29. The presentation server of claim 28 which can be configured to automatically generate responses to each of the client devices on behalf of at least one of the data sources.

30. The presentation server of claim 28 which can process a request by each of the client devices for a single transaction update to multiple data sources and return an indication of whether the update was successful.

31. The presentation server of claim 30 which can process a request by each of the client devices for a single transaction update to multiple data sources in such a way that all data source updates are only confirmed once each data source has preliminarily indicated that the update would succeed.

32. The presentation server of claim 31 in which failure of any one of the transaction updates causes all the transaction updates to be cancelled and a failure response to be returned to each of the client devices that requested the transaction.

33. The presentation server of claim 31 in which a preliminary validation of all transactions causes all transactions to be confirmed and returns a success indication to each of the client devices that requested the transaction.

34. The presentation server of claim 1 which returns the message that results in a user interface at each of the client devices being updated at the same time as it issues a message that results in the user interface of different client devices being updated in the same manner.

35. The presentation server of claim 1 which can update marginal portions of a database layer in each of the client device by sending, instead of an entire structured data tree hierarchy, a key which identifies the part of the structured data tree which has changed.

36. The presentation server of claim 1 which can update a database layer in each of the client devices by altering, in real time, configuration data held in the database layer which defines how the structured data can be interacted with from within a user interface.

37. The presentation server of claim 1 which can prioritize updates to each of the client devices that is returning on-line after an absence.

38. The presentation server of claim 1 which can update a database layer in each of the client devices by re-initializing all of the structured data on each of the client devices that is returning on-line after an absence by applying rules to determine if re-initialization is appropriate.

39. The presentation server of claim 1 which stores updated structured data in a transaction log record from which each of the client devices can pull updates.

40. The presentation server of claim 1 which stores updated data in a transaction log record and pushes updates as appropriate to each of the client devices.

41. The presentation server of claim 1 which is able to send updating data to different client devices at different times or frequencies.

42. The presentation server of claim 1 which can be configured to skip unnecessary intermediate updates to streaming data for devices whose connection or client device is too inefficient to receive and process every update.

43. The presentation server of claim 1 which can maintain a statefull connection with each of the client devices.

44. The presentation server of claim 43 which maintains a statefull connection with each of the client devices by routing a unique, incrementing number to each of the client devices, which the presentation server logs in relation to all data updates, so that when each of the client devices returns on-line from an absence, each of the client devices sends the latest number it received back to the presentation server so that the presentation server can determine what updates each of the client devices did not receive and therefore needs to be sent.

45. The presentation server of claim 1 which is sent by each of the client devices any parameters that need to be persistent and stores these parameters or routes them to storage for later retrieval.

46. The presentation server of claim 1 which provides scalability in the number of client devices a network based application can communicate with by being scalable with:
   (a) multiple CPUs on a presentation server computer;
   (b) multiple CPUs on multiple presentation server computers in a parallel or in a parent/child arrangement;
   and managing the message flows from each CPU to the applicable client devices.

47. The presentation server of claim 1 which provides fault tolerance by being scalable with:
   (a) multiple CPUs on a presentation server computer;
   (b) multiple CPUs on multiple presentation server computers in a parallel or in a parent/child arrangement, providing a mechanism to automatically compensate for failures of instances on one or more CPUs by reconfiguring the network configuration at run-time and optionally re-establish connectivity for each orphaned client device to an alternate presentation server.

48. The presentation server of claim 1, forming part of a network of several geographically separated presentation server computers, some or all of which operate as edge servers.

49. The presentation server of claim 1 forming part of a network of several geographically separated presentation server computers organized into a topology which is appropriate to the physical arrangement of sites in a business running the network based application.

50. The presentation server of claim 1 which can combine structured data from several different server based applications for a given client device.

51. The presentation server of claim 1 which can determine automatically and in real time, when each of the client devices requests several images, whether it should reduce bandwidth consumption by placing all of the images into a single, composite image file, each image sharing data which is not image specific.

52. The presentation server of claim 1 which modifies the data it sends to each of the client devices in dependence on information sent to the presentation server from each of the client devices which relates to the display limitations of each of the client devices.

53. The presentation server of claim 1 which uses a session object associated with an applet to determine the specific display parameters and structured data to be served to each of the client devices.

54. The presentation server of claim 1 in which at least one of the data sources is a web server, a back end application or a web service.

* * * * *